US009575209B2

United States Patent
Samson et al.

(10) Patent No.: US 9,575,209 B2
(45) Date of Patent: Feb. 21, 2017

(54) REMOTE SENSING METHODS AND SYSTEMS USING NONLINEAR LIGHT CONVERSION AND SENSE SIGNAL TRANSFORMATION

(71) Applicant: Halliburton Energy Services Inc. ("HESI"), Duncan, OK (US)

(72) Inventors: Etienne M. Samson, Cypress, TX (US); Tasneem A. Mandviwala, Katy, TX (US); Robert P. Freese, Pittsboro, NC (US); David Perkins, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 397 days.

(21) Appl. No.: 13/726,041

(22) Filed: Dec. 22, 2012

(65) Prior Publication Data

US 2014/0175271 A1   Jun. 26, 2014

(51) Int. Cl.
| | |
|---|---|
| *G01V 5/00* | (2006.01) |
| *G01V 8/02* | (2006.01) |
| *G01J 1/42* | (2006.01) |
| *E21B 47/12* | (2012.01) |
| *E21B 49/08* | (2006.01) |

(52) U.S. Cl.
CPC .............. *G01V 8/02* (2013.01); *E21B 47/123* (2013.01); *E21B 49/08* (2013.01); *G01J 1/42* (2013.01)

(58) Field of Classification Search
CPC ................................ E21B 47/123; G01V 8/02
See application file for complete search history.

(56) References Cited

U.S. PATENT DOCUMENTS

| 4,162,400 A | * | 7/1979 | Pitts, Jr. .................... 340/854.7 |
|---|---|---|---|
| 4,360,272 A | | 11/1982 | Schmadel et al. |
| 4,950,883 A | | 8/1990 | Glenn et al. |
| 4,996,419 A | | 2/1991 | Morey et al. |

(Continued)

FOREIGN PATENT DOCUMENTS

| EP | 0212915 A2 | 3/1987 |
|---|---|---|
| EP | 0856753 A1 | 5/1998 |

(Continued)

OTHER PUBLICATIONS

Cranch, Geoffrey A., et al., "Distributed Feedback Fiber Laser Strain Sensors", IEEE Sensors Journal, vol. 8, No. 7, (Jul. 2008), 12 pgs.

(Continued)

*Primary Examiner* — Kiho Kim
(74) *Attorney, Agent, or Firm* — Iselin Law PLLC; Benjamin Fite

(57) ABSTRACT

A system includes a light source and a nonlinear converter optically coupled to and remote from the light source. The nonlinear light converter converts a light pulse received from the light source to a broadened or spectrum-shifted light pulse. The system also includes a sensor in situ with the nonlinear light converter. The sensor performs a sense operation based on the broadened or spectrum-shifted light pulse and generates an electrical signal corresponding to the sense operation. The system also includes an electro-optical interface in situ with the sensor that transforms the electrical signal to an optical signal for conveyance to a signal collection interface.

19 Claims, 10 Drawing Sheets

(56) References Cited

U.S. PATENT DOCUMENTS

| | | |
|---|---|---|
| 5,037,172 A | 8/1991 | Hekman et al. |
| 5,305,075 A | 4/1994 | Bucholtz et al. |
| 5,317,576 A | 5/1994 | Leonberger et al. |
| 5,396,166 A | 3/1995 | Vohra et al. |
| 5,511,083 A | 4/1996 | D'Amato |
| 5,513,913 A | 5/1996 | Ball et al. |
| 5,642,051 A | 6/1997 | Babour et al. |
| 5,691,999 A | 11/1997 | Ball et al. |
| 5,729,013 A * | 3/1998 | Bergren, III ............. 250/255 |
| 5,804,736 A | 9/1998 | Klauder et al. |
| 5,844,927 A | 12/1998 | Kringlebotn |
| 6,137,621 A | 10/2000 | Wu |
| 6,188,712 B1 | 2/2001 | Jiang et al. |
| 6,271,766 B1 | 8/2001 | Didden et al. |
| 6,522,797 B1 | 2/2003 | Siems et al. |
| 6,534,986 B2 | 3/2003 | Nichols |
| 6,591,025 B1 | 7/2003 | Siems et al. |
| 6,630,658 B1 | 10/2003 | Bohnert et al. |
| 6,731,114 B1 | 5/2004 | Lagabrielle et al. |
| 6,731,389 B2 | 5/2004 | Luscombe et al. |
| 6,931,188 B2 | 8/2005 | Kersey et al. |
| 6,961,601 B2 | 11/2005 | Matthews et al. |
| 7,077,200 B1 | 7/2006 | Adnan et al. |
| 7,183,777 B2 | 2/2007 | Bristow et al. |
| 7,391,942 B2 | 6/2008 | Loock et al. |
| 7,492,168 B2 | 2/2009 | Ogilvy et al. |
| 7,623,233 B2 | 11/2009 | Freese et al. |
| 7,641,395 B2 | 1/2010 | Ringgenberg et al. |
| 7,669,440 B2 | 3/2010 | Kersey et al. |
| 7,673,682 B2 | 3/2010 | Daily |
| 7,990,538 B2 | 8/2011 | Myrick et al. |
| 8,027,855 B2 | 9/2011 | Freese et al. |
| 8,058,869 B2 | 11/2011 | Cranch et al. |
| 8,135,541 B2 | 3/2012 | Davis et al. |
| 8,154,726 B2 | 4/2012 | Blackburn et al. |
| 8,165,178 B2 | 4/2012 | Henderson et al. |
| 8,208,147 B2 | 6/2012 | Myrick et al. |
| 8,212,216 B2 | 7/2012 | Perkins et al. |
| 8,213,006 B2 | 7/2012 | Myrick et al. |
| 8,213,012 B2 | 7/2012 | Myrick et al. |
| 8,278,923 B2 | 10/2012 | Samson et al. |
| 8,380,439 B2 | 2/2013 | Lagmanson et al. |
| 2002/0063866 A1 | 5/2002 | Kersey et al. |
| 2003/0038634 A1 | 2/2003 | Strack |
| 2003/0095263 A1 | 5/2003 | Varshneya et al. |
| 2003/0205083 A1 | 11/2003 | Tubel et al. |
| 2003/0205375 A1 | 11/2003 | Wright et al. |
| 2004/0031923 A1 | 2/2004 | Sanders |
| 2004/0033017 A1 | 2/2004 | Kringlebotn et al. |
| 2004/0093950 A1 | 5/2004 | Bohnert |
| 2004/0112595 A1 * | 6/2004 | Bostick, III ............. E21B 21/08 166/250.01 |
| 2004/0113104 A1 | 6/2004 | Maida, Jr. |
| 2004/0117119 A1 | 6/2004 | West et al. |
| 2004/0141420 A1 | 7/2004 | Hardage et al. |
| 2004/0163809 A1 | 8/2004 | Mayeu et al. |
| 2005/0281511 A1 | 12/2005 | Ringgenberg et al. |
| 2006/0018611 A1 | 1/2006 | Maida |
| 2006/0081412 A1 | 4/2006 | Wright et al. |
| 2006/0215974 A1 | 9/2006 | Maida |
| 2006/0250274 A1 | 11/2006 | Mombourquette et al. |
| 2007/0126594 A1 * | 6/2007 | Atkinson ............. E21B 47/123 340/853.1 |
| 2007/0146866 A1 * | 6/2007 | Wright ............. 359/332 |
| 2007/0228288 A1 | 10/2007 | Smith |
| 2008/0042636 A1 | 2/2008 | Koste et al. |
| 2008/0073084 A1 | 3/2008 | Ringgenberg et al. |
| 2008/0245960 A1 | 10/2008 | Csutak |
| 2008/0276687 A1 | 11/2008 | Myrick et al. |
| 2009/0002697 A1 * | 1/2009 | Freese et al. ............. 356/300 |
| 2009/0180101 A1 * | 7/2009 | Csutak ............. G01N 21/51 356/70 |
| 2009/0188665 A1 | 7/2009 | Tubel et al. |
| 2009/0219539 A1 | 9/2009 | Myrick et al. |
| 2009/0296755 A1 | 12/2009 | Brown et al. |
| 2009/0316150 A1 | 12/2009 | Myrick et al. |
| 2010/0149537 A1 | 6/2010 | Myrick et al. |
| 2010/0158435 A1 | 6/2010 | Kersey et al. |
| 2010/0182600 A1 | 7/2010 | Freese et al. |
| 2010/0195105 A1 | 8/2010 | Myrick et al. |
| 2010/0271030 A1 | 10/2010 | Reiderman et al. |
| 2010/0302539 A1 | 12/2010 | Myrick et al. |
| 2010/0328669 A1 | 12/2010 | Myrick et al. |
| 2011/0017512 A1 | 1/2011 | Cidazzu |
| 2011/0083838 A1 | 4/2011 | Labrecque |
| 2011/0084696 A1 | 4/2011 | Tenghamn et al. |
| 2011/0085726 A1 * | 4/2011 | Den Boef ............. G03F 9/7065 382/151 |
| 2011/0088462 A1 | 4/2011 | Samson et al. |
| 2011/0090496 A1 | 4/2011 | Samson et al. |
| 2011/0116099 A1 | 5/2011 | Spross et al. |
| 2011/0139447 A1 | 6/2011 | Ramos et al. |
| 2011/0163891 A1 | 7/2011 | Wilson et al. |
| 2011/0290992 A1 * | 12/2011 | Sato et al. ............. 250/253 |
| 2011/0297372 A1 | 12/2011 | Maida et al. |
| 2011/0298457 A1 | 12/2011 | Samson et al. |
| 2011/0308788 A1 | 12/2011 | Ravi et al. |
| 2012/0013893 A1 | 1/2012 | Maida et al. |
| 2012/0014211 A1 | 1/2012 | Maida et al. |
| 2012/0018167 A1 | 1/2012 | Konopczynski et al. |
| 2012/0061084 A1 | 3/2012 | Sweatman et al. |
| 2012/0126993 A1 | 5/2012 | Samson et al. |
| 2012/0147381 A1 | 6/2012 | Leblanc et al. |
| 2012/0147924 A1 | 6/2012 | Hall |
| 2012/0175513 A1 | 7/2012 | Duncan et al. |
| 2012/0205103 A1 | 8/2012 | Ravi et al. |
| 2012/0223717 A1 | 9/2012 | Labrecque |
| 2012/0257475 A1 | 10/2012 | Luscombe et al. |
| 2012/0293179 A1 | 11/2012 | Colombo et al. |
| 2013/0056197 A1 | 3/2013 | Maida et al. |
| 2013/0249705 A1 | 9/2013 | Sharp et al. |
| 2013/0279841 A1 | 10/2013 | Joinson |
| 2014/0036628 A1 | 2/2014 | Hill et al. |
| 2014/0175271 A1 | 6/2014 | Samson et al. |
| 2014/0175272 A1 | 6/2014 | Samson et al. |
| 2014/0222343 A1 | 8/2014 | Samson et al. |

FOREIGN PATENT DOCUMENTS

| | | |
|---|---|---|
| WO | WO-99/15858 | 4/1999 |
| WO | WO-00/12978 | 3/2000 |
| WO | WO-2007/066146 | 6/2007 |
| WO | WO-2008/124286 | 10/2008 |
| WO | WO-2012/061844 | 5/2012 |
| WO | WO-2012/075474 | 6/2012 |
| WO | WO-2012/100217 | 7/2012 |
| WO | WO-2014/099053 | 6/2014 |
| WO | WO-2014/099054 | 6/2014 |
| WO | WO-2014/120305 | 8/2014 |

OTHER PUBLICATIONS

Maida, John L., et al., "Downhole Species Selective Optical Fiber Sensor Systems and Methods", U.S. Appl No. 13/253,788, filed Oct. 5, 2011, 23 pgs.

Maida, John L., et al., "Optical Casing Collar Locator Systems and Methods", U.S. Appl No. 13/226,578, filed Sep. 7, 2011, 30 pgs.

Perkins, David L., "Spatial Heterodyne Integrated Computational Element (SH-ICE) Spectrometer," PCT Appl No. PCT/US12/55167 filed Sep. 13, 2012, 22 pgs.

Samson, Etienne M., Downhole Systems and Methods for Water Source Determination, U.S. Appl. No. 13/418,455, filed Mar. 13, 2012, 27 pgs.

Sharp, David P., et al., "Casing Collar Locator with Wireless Telemetry Support", U.S. Appl. No. 13/426,414, filed Mar. 21, 2012, 30 pgs.

Skinner, Neal G., et al., "Downhole Time Domain Reflectometry with Optical Components", U.S. Appl. No. 13/655,607, filed Oct. 19, 2012, 32 pgs.

"PCT Application as Filed", Appl No. PCT/US2014/038542, "A Magnetic Induction Sensor with an Electro-Optical Transducer and Related Methods and Systems," filed May 19, 2014, 30 pgs.

(56) References Cited

OTHER PUBLICATIONS

"PCT Application as Filed", PCT/US2014/038552, "Optical Magnetic Field Sensor Units for a Downhole Environment," filed May 19, 2014, 24 pgs.
"PCT International Search Report and Written Opinion", Dated Nov. 5, 2014, Appl No. PCT/US2014/019228, "Optical Electric Field Sensors Having Passivated Electrodes ," filed Feb. 28, 2014, 14 pgs.
"PCT Search report and written opinion", Dated Feb. 28, 2014, Appl No. PCT/US2013/058125, "Remote Sensing Methods and Systems Using Nonlinear Light Conversion and Sense Signal Transformation," filed Sep. 5, 2013, 12 pgs.
"PCT search reporting and written opinion", Dated Feb. 28, 2014, Appl No. PCT/US2013/058127, "Remote Work Methods and Systems Using Nonlinear Light Conversion," filed Sep. 5, 2013, 14 pgs.
"PCT Written Opinion", Dated Jan. 12, 2014, Appl No. PCT/US2013/067288, "Distributed Feedback Fiber Laser Strain Sensor Systems and Methods for Subsurface EM Field Monitoring," filed Nov. 29, 2013, 16 pgs.
"PCT International Search Report and Written Opinion", dated Feb. 4, 2015, Appl No. PCT/US2014/038542, "A Magnetic Induction Sensor with an Electro-Optical Transducer and Related Methods and Systems," filed May 19, 2014, 17 pgs.
"PCT International Search Report and Written Opinion", dated Feb. 17, 2015, Appl No. PCT/US2014/038552, "Optical Magnetic Field Sensor Units for a Downhole Environment," filed May 19, 2015, 15 pgs.
"US Non-Final Office Action", dated Oct. 8, 2014, U.S. Appl. No. 13/722,623, "Remote Work Methods and Systems Using Nonlinear Light Conversion," filed Dec. 20, 2012, 9 pgs.
Ball, G A., et al., "Single- and Multipoint Fiber-Laser Sensors", IEEE Photonics Technology Letters, vol. 5, No. 2, (Feb. 1993), 4 pgs.
Bergmann, Peter et al., "Surface-Downhole Electrical Resistivity Tomography Applied to Monitoring of CO2 Storage at Ketzin, Germany", Geophysics, vol. 77, No. 6, (Nov.-Dec. 2012), pp. B253-B267.
Bhatia, Vikram et al., "Optical Fiber Long-Period Grating Sensors", Optics Letter, vol. 21, No. 9, (May 1, 1996), 3 pgs.
Bristow, Q. et al., "A New Temperature, Capacitive-Resistivity, and Magnetic-Susceptibility Borehole Probe for Mineral Exploration, Groundwater, and Environmental Applications", Geological Survey of Canada, Technical Note No. 3, doi: 10.4095/289197, (2011), 13 pgs.
Broeng, Jes et al., "Photonic Crystal Fibers in the Market", The 16th Opto-Electrics and Communications Conference, (Jul. 4, 2011), 53 pgs.
Carrigan, Charles R. et al., "Electrical resistance tomographic monitoring of CO2 movement in deep geologic reservoirs", International Journal of Greenhouse Gas Control, doi: 10.1016/j.ijggc. (2013), pp. 401-408.
Deceuster, John et al., "Automated Identification of Changes in Electrode Contact Properties for Long-Term Permanent ERT Monitoring Experiments", Geophysics, vol. 78, No. 2 (Mar.-Apr. 2013), pp. E79-E94.
Douma, Marten et al., "A Capacitive-Coupled Ground Resistivity System for Engineering and Environmental Applications: Results of Two Canadian Field Tests", SEG Annual Meeting, Expanded Abstracts, (1994), pp. 559-561.
Fedotov, Andrei B. et al., "Frequency-Tunable Supercontinuum Generation in Photonic-Crystal Fibers by Femtosecond Pulses of an Optical Parametric Amplifier", J. Opt. Soc. Am. B/vol. 19, No. 9/Sep. 2002, XP-002275995, (2002), pp. 2156-2164.
Garmire, Elsa Garmire, Elsa, "Overview of Nonlinear Optics," Nonlinear Optics, Natalia Kamanina (Ed.), ISBN: 978-953-51/0131-4, InTech, DOI: 10.5772/37416. Available from: http://www.intechopen.com/books/nonlinear-optics/overview-of-nonlinear-optics, (2012),1 pg.

Grard, R. et al., "A Mobile Four-Electrode Array and Its Application to the Electrical Survey of Planetary Grounds at Shallow Depths", Journal of Geophysical Research, vol. 96, No. B3, (Mar. 10, 1991), pp. 4117-4123.
Hecht, Jeff "Fiber Lasers: The State of the Art", Laser Focus World, vol. 48, No. 4, Apr. 1, 2012, p. 57, XP055102644, ISSN: 1043-8092 [retrieved from: http://www.laserfocusworld.com/articles/print/volume-48/issue-04/features/the-state-of-the-art.html], (2012), 24 pgs.
Hibbs, A. D. et al., "Capacitive Electric Field Measurements for Geophysics", EAGE Conference and Exhibition incorporating SPE EUROPEC 2011, Vienna, Austria, Expanded Abstracts, (2011), 2 pgs.
Hibbs, Andrew et al., "New Electromagnetic Sensors for Magnetotelluric and Induced Polarization Geophysical Surveys", SEG Annual Meeting, Expanded Abstracts, (2012), 5 pgs.
Kiessling, Dana et al., "Geoelectrical Methods for Monitoring Geological CO2 Storage: First Results From Cross-Hole and Surface-Downhole Measurements From the CO2SINK Test Site at Ketzin (Germany)", International Journal of Greenhouse Gas Control, 4, (2010), pp. 816-826.
Kuras, Oliver et al., "Capacitive Resistivity Imaging With Towed Arrays", Journal of Engineering and Environmental Geophysics, vol. 12, Issue 3, (2007), pp. 267-279.
Kuras, Oliver et al., "Fundamentals of the Capacitive Resistivity Technique", Geophysics, vol. 71, No. 3 (May-Jun. 2006), pp. G135-G152.
Labrecque, Douglas et al., "Assessment of Measurement Errors for Galvanic-Resistivity Electrodes of Different Composition", Geophysics, vol. 73, No. 2 (Mar.-Apr. 2008), pp. F55-F64.
MacNae, James "Electric Field Measurements in Air", SEG Annual Meeting, Expanded Abstracts, (2010), pp. 1773-1777.
MacNae, James et al., "Near-Surface Resistivity Contast Mapping With a Capacitive Sensor Array and an Inductive Source", Geophysics, vol. 76, No. 2, (Mar.-Apr. 2011), pp. G13-G23.
Mandviwala, Tasneem A., "Well Monitoring with Optical Electromagnetic Sensors", U.S. Appl. No. 13/679,926, filed Nov. 16, 2012, 28 pgs.
Mwenifumbo, C. J. et al., "Field Evaluation of a New Borehole Resistivity Probe Using Capacitive Electrodes", Proceedings of the Symposium on the Applications of Geophysics to Engineering and Environmental Problems, (1999), pp. 859-867.
Mwenifumbo, C. Jonathan et al., "Capacitive Conductivity Logging and Electrical Stratigraphy in a High-Resistivity Aquifer, Boise Hydrogeophysical Research Site", Geophysics, vol. 74, No. 3 (May-Jun. 2009), pp. E125-E133.
NKT Photonics, NKT Photonics, "Supercontinuum Generation in Photonics Crystal Fibers", (Jul. 2009), 10 pgs.
Panissod, Cedric et al., "Recent Developments in Shallow-Depth Electrical and Electrostatic Prospecting Using Mobile Arrays", Geophysics, vol. 63, No. 5 (Sep.-Oct. 1998), pp. 1542-1550.
Petiau, Gilbert "Second Generation of Lead-Lead Chloride Electrodes for Geophysical Applications", Pure and Applied Geophysics, 157, (2000), pp. 357-382.
Shima, Hiromasa et al., "Developments of Non-Contact Data Acquisition Techniques in Electrical and Electromagnetic Explorations", Journal of Applied Geophysics, 35, (1996), pp. 167-173.
Tabbagh, Alain et al., "Determination of Electrical Properties of the Ground at Shallow Depth With an Electrostatic Quadrupole: Field Trials on Archaeological Sites", Geophysical Prospecting, 41, (1993), pp. 579-597.
Teipel, J. et al., Teipel, J. et al., "Characteristics of supercontinuum generation in tapered fibers using femtosecond laser pulses", Institut für Angewandte Physik, Universität Bonn, Wegelerstr. 8, 53115 Bonn, Germany, (Jul. 16, 2003), 7 pgs.
Thiel, David V. "On Measuring Electromagnetic Surface Impedance—Discussions with Professor James R. Wait", IEEE Transactions on Antennas and Propogation, vol. 48, No. 10, (2000), pp. 1517-1520.
Timofeeev, V.M. et al., "A New Ground Resistivity Method for Engineering and Environmental Geophysics", Proceedings of the Symposium on the Applications of Geophysics to Engineering and Environmental Problems, (1994), pp. 701-715.

(56) References Cited

OTHER PUBLICATIONS

Tondel, Richard et al., "Remote Reservoir Monitoring in Oil Sands: From Feasibility Study to Baseline Datasets", CSEG-CSPG-CWLS GeoConvention, Expanded Abstracts, (2013), 5 pgs.

Tondel, Richard et al., "Reservoir Monitoring in Oil Sands: Developing a Permanent Cross-Well System", SEG Annual Meeting, Expanded Abstracts, (2011), pp. 4077-4081.

Wilson, Glen et al., "Optical Electric Field Sensors Having Passivated Electrodes", dated Feb. 28, 2014, Appl No. PCT/US2014/019228, "Optical Electric Field Sensors Having Passivated Electrodes," filed Feb. 28, 2014, 18 pgs.

Zonge, Kenneth L. et al., "The Effect of Electrode Contact Resistance on Electric Field Measurements", 55th SEG Annual Meeting, Washington D.C., Expanded Abstracts, (1985), 8 pgs.

"PCT International Preliminary Report on Patentability", dated Jul. 2, 2015, Appl No. PCT/US2013/058127, "Remote Work Methods and Systems Using Nonlinear Light Conversion," filed Sep. 5, 2013, 9 pgs.

"PCT International Preliminary Report on Patentability", dated Jul. 2, 2015, Appl No. PCT/US2013/058125, "Remote Sensing Methods and Systems Using Nonlinear Light Conversion and Sense Signal Transformation," filed Sep. 5, 2013, 8 pgs.

\* cited by examiner

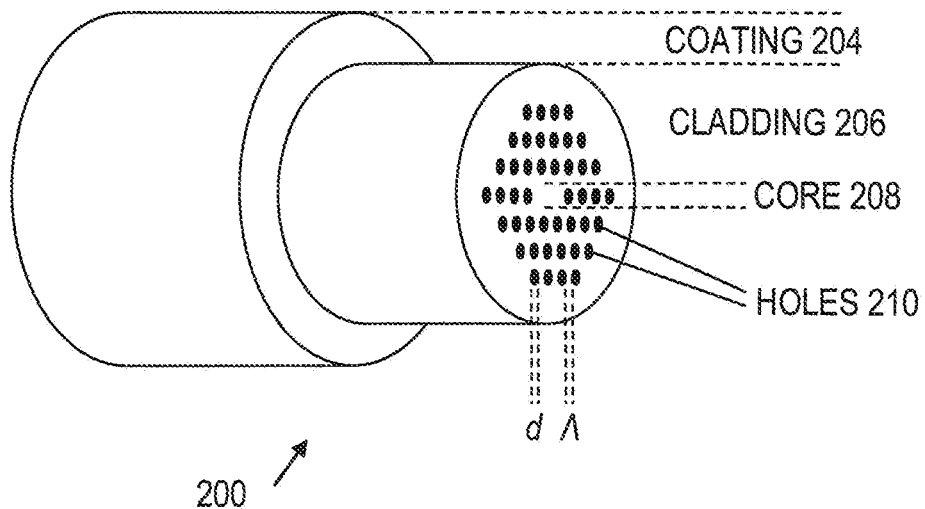
FIG. 2A
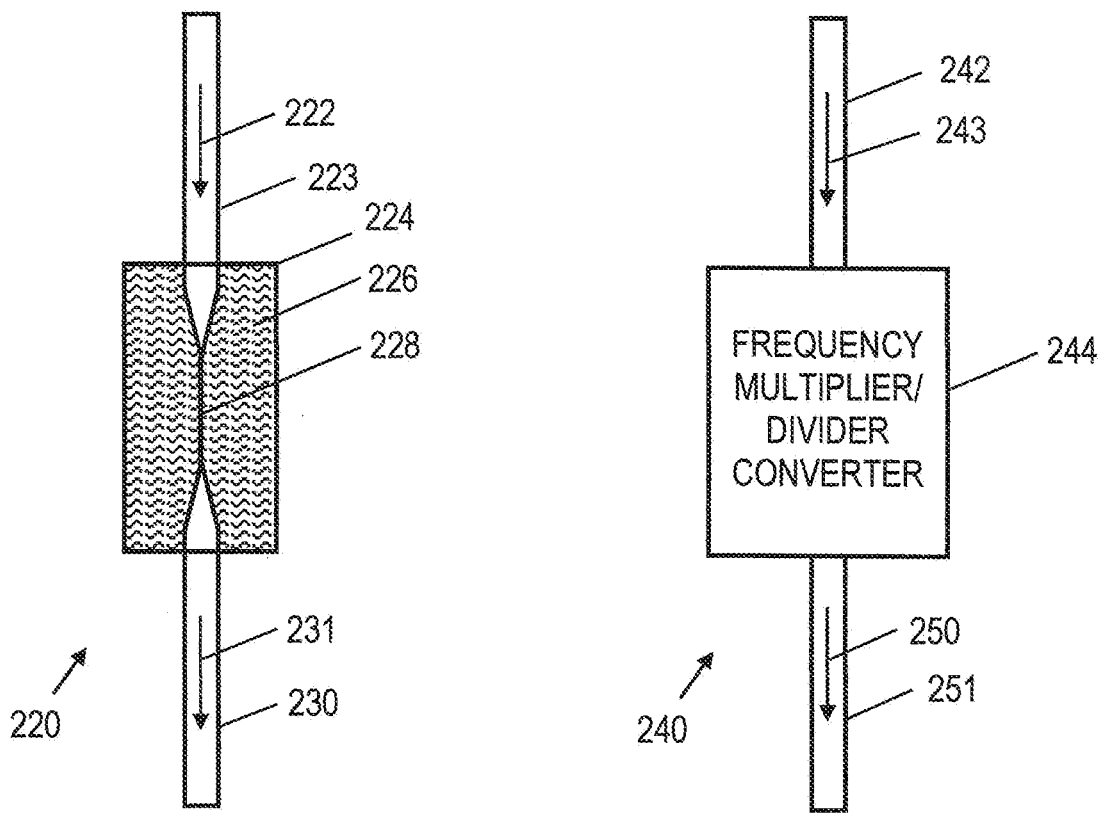
FIG. 2B
FIG. 2C

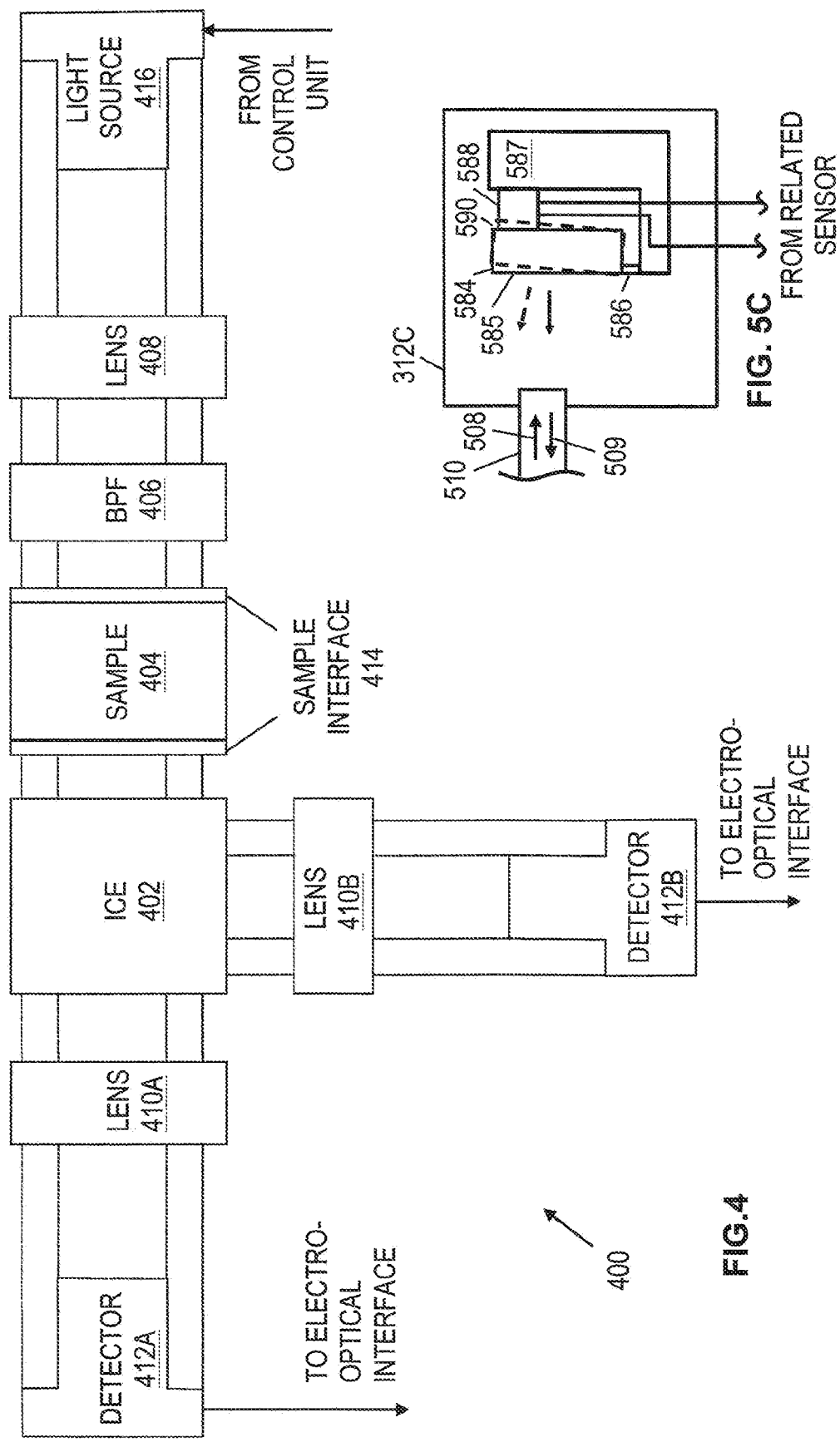

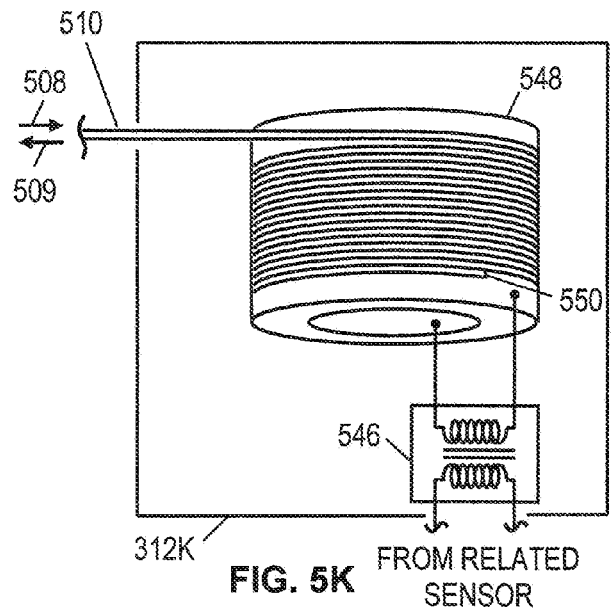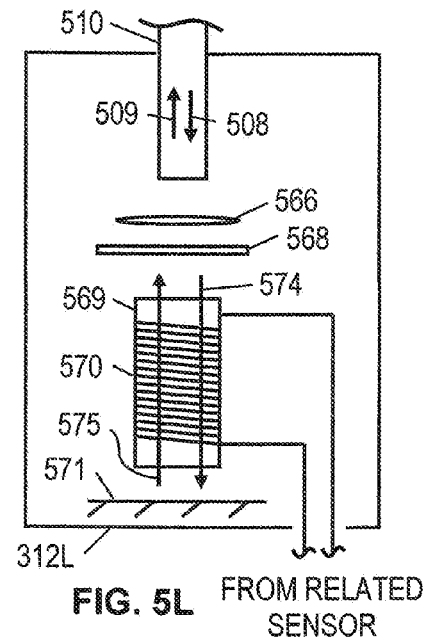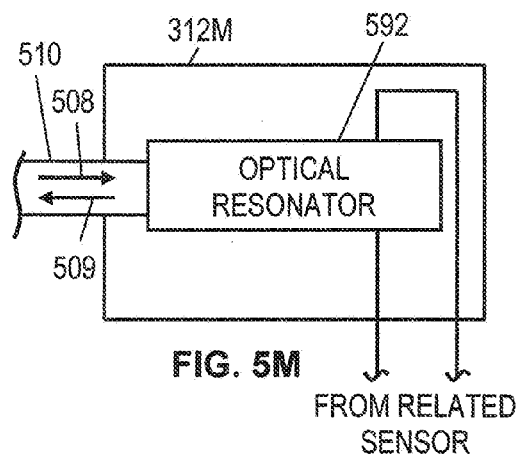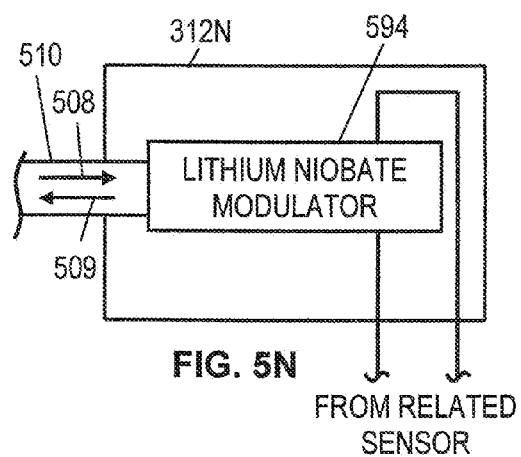

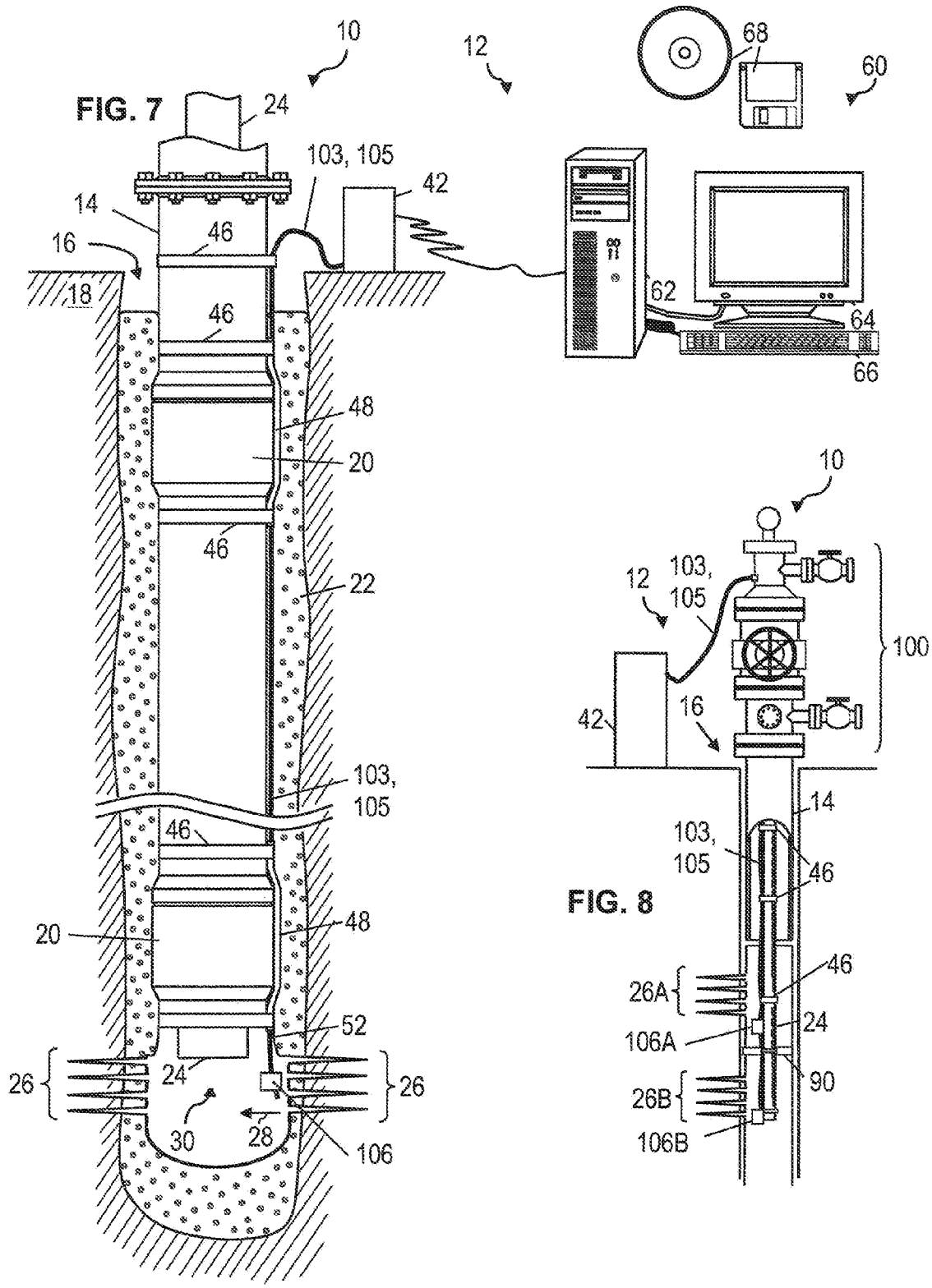

REMOTE SENSING METHODS AND SYSTEMS USING NONLINEAR LIGHT CONVERSION AND SENSE SIGNAL TRANSFORMATION

BACKGROUND

Modern oil field operations demand a great quantity of information relating to the parameters and conditions encountered downhole. Such information typically includes characteristics of the earth formations traversed by a borehole, and data relating to the size and configuration of the borehole itself. In general, sensor-based data acquisition occurs during various oil field operations including drilling, openhole logging, well completion, treatment applications, and production.

Of the various types of sensors that are available to collect downhole data, optical sensors offer particularly useful measurements for characterizing downhole fluids and materials. However, many such measurements require light spectra that cannot feasibly be transmitted downhole. Drawbacks also exit with proposed sensing systems having downhole light sources. For example, it can be difficult to achieve the desired level of accuracy and operational robustness with an incandescent bulb. Such issues do not appear to be adequately addressed by the prior art.

BRIEF DESCRIPTION OF THE DRAWINGS

Accordingly, there are disclosed in the drawings and the following description various remote sensing methods and systems using nonlinear light conversion. In the drawings:

FIGS. 2A-2C show illustrative nonlinear light converters.

FIG. 4 shows an illustrative optical sensor for downhole fluid analysis.

FIGS. 7-9 show illustrative remote sensing environments.

Figure 1:
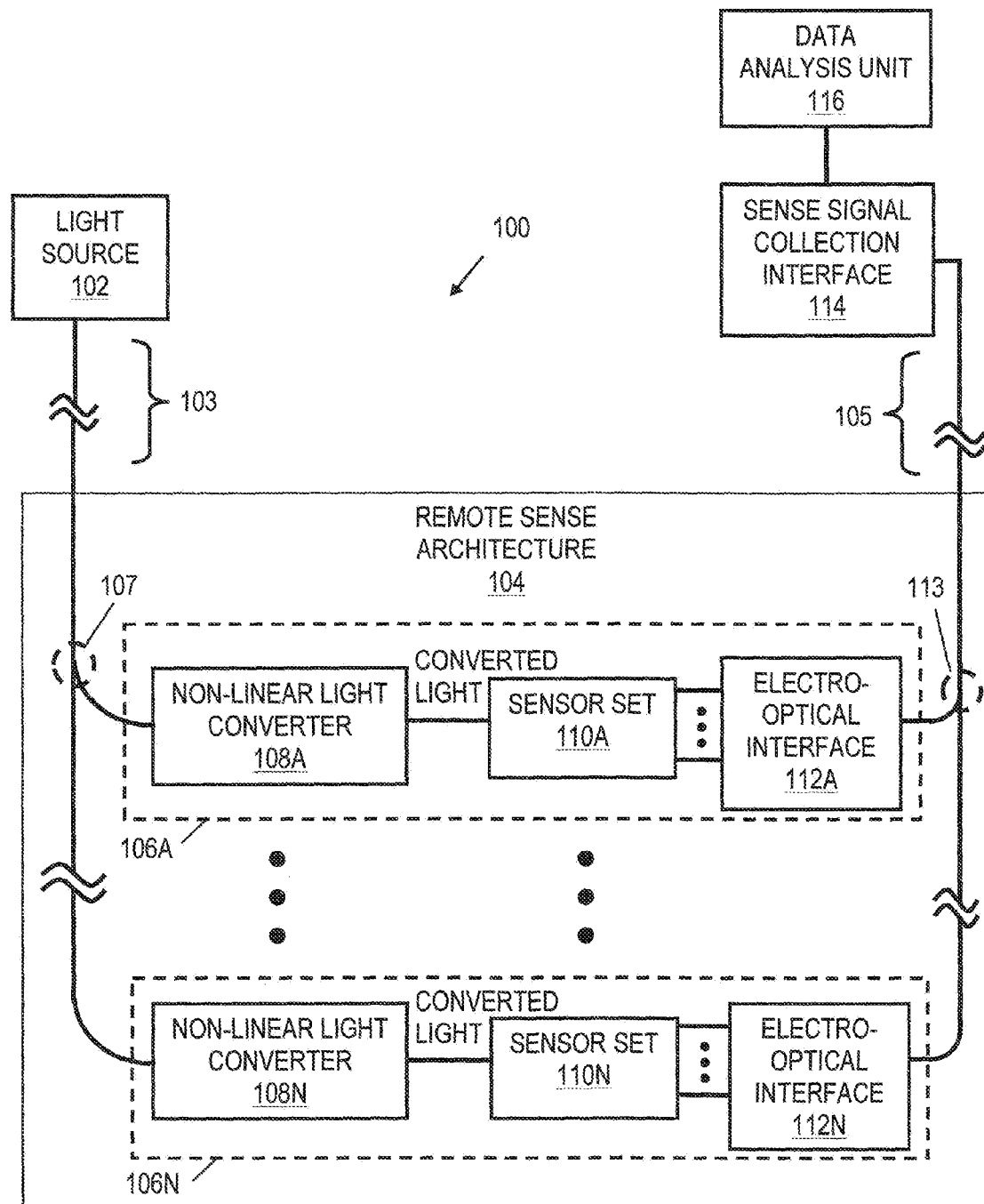
FIG. 1 is a block diagram of an illustrative remote sensing system.

It should be understood, however, that the specific embodiments given in the drawings and detailed description thereof do not limit the disclosure. On the contrary, they provide the foundation for one of ordinary skill to discern the alternative forms, equivalents, and modifications that are encompassed in the scope of the appended claims.

DETAILED DESCRIPTION

Disclosed herein are remote sensing methods and systems using nonlinear light conversion and sense signal transformation. An example remote sensing system includes a light source and a nonlinear light converter optically coupled to and remote from the light source. The nonlinear light converter converts a light pulse received from the light source to a broadband or spectrum-shifted light pulse. In some embodiments, the light source outputs a narrowband light pulse. In other embodiments, the light source outputs a broadband light pulse or multi-mode light pulse.

The remote sensing system also includes a sensor in situ with the nonlinear light converter to perform a sense operation based on the broadband or spectrum-shifted light pulse and to generate a voltage signal corresponding to the sense operation. An electro-optical interface in situ with the sensor transforms the voltage signal to an optical signal for conveyance to a sense signal collection interface. Various nonlinear light converter embodiments are disclosed, including supercontinuum light converters and frequency converters. Various sensor embodiments are also disclosed, including integrated computation element (ICE)-based sensors for downhole fluid analysis. The ICE sensors generate voltage signals responsive to sense operations, and these voltage signals are transformed to optical signals for conveyance to a surface sense signal collection interface.

FIG. 1 is a block diagram of an illustrative remote sensing system 100. As shown, the system 100 includes a light source 102 that is optically coupled to components of remote sense architecture 104 via a fiber optic cable 103 and splitters 107. The remote sense architecture 104 includes different sensor zones 106A-106N, where each of the sensor zones 106A-106N includes a nonlinear light converter, a sensor set, and an electro-optical interface. More specifically, sensor zone 106A includes nonlinear light converter 108A, sensor set 110A, and electro-optical interface 112A, while sensor zone 106B includes nonlinear light converter 108B, sensor set 110B, and electro-optical interface 112B, and so on. Although a plurality of sensor zones 106A-106N are shown in FIG. 1, it should be understood that some remote sensing system embodiments may employ a single sensor zone.

Electrical signals output from the sensor sets 110A-110N in response to sense operations are transformed by the electro-optical interfaces 112A-112N to optical signals as described herein. The optical signals are conveyed by combiners 113 and fiber optic cable 105 to a sense signal collection interface 114. In some embodiments, wavelength division multiplexing (WDM) or time division multiplexing (TDW) is used to convey the optical signals to the sense signal collection interface 114. The gathered sense signals are provided to data analysis unit 116 for processing and/or display of parameter values, charts, diagrams, etc. Preferably, the sense signals output from the remote sense architecture 104 are transmitted in real-time to the sense signal collection interface 114 and data analysis unit 116, which are located remotely from the remote sense architecture 104. For example, the signal collection interface 114 and the data analysis unit 116 may be at a surface location while the remote sense architecture 104 is downhole. In different embodiments, the signal collection interface 114 and the data analysis unit 116 may be local or remote to each other. Similarly, the light source 102 may be located local or remote to either the signal collection interface 114 or the data analysis unit 116.

FIGS. 2A-2C show illustrative nonlinear light converters 200, 220, and 240 for the remote sensing system 100 of FIG. 1. The remote sensing system 100 implements one or more of any of the nonlinear light converters 200, 220, and 240 for each of the sensor zones 106A-106N. The nonlinear light converter 200 of FIG. 2A corresponds to a photonic crystal fiber (PCF) that operates as a supercontinuum light source. As shown, the nonlinear light converter 200 includes coating 204, cladding 206, and core 208. The cladding 206 has various holes 210 with hole-size d and hole-pitch Λ, which varies for different PCF designs. In operation, narrowband light traveling through a length of the nonlinear light converter 200 is modified due to the dispersive effect of the cladding 206 with holes 210. In accordance with some embodiments, a length (e.g., 10-20 meters) of the nonlinear light converter 200 converts a narrowband light pulse to a supercontinuum light pulse to enable remote sense operations. As an example, if nonlinear light converter 200 corresponds to nonlinear light converter 108A of sensor zone 106A, then the sensor set 110A may perform sense operations using a supercontinuum light pulse output from the nonlinear light converter 200. Various factors affect generation of supercontinua by the nonlinear light converter 200 including the dispersion effect of the cladding 206 relative to the pumping wavelength, the pulse length, and the peak power.

The nonlinear light converter 220 of FIG. 2B corresponds to a tapered fiber with dispersive cladding that operates as a supercontinuum light source. In FIG. 2B, narrowband light 222 traveling through fiber 223 reaches a dispersion cladding container 224 in which a tapered fiber 228 resides. The dispersion cladding container 224 is filled with a dispersive material 226 such as heavy water. The narrowband light 222 entering the dispersion cladding container 224 is modified by the dispersive material 226 such that a spectrum-shifted light pulse 231 (relative to the narrowband light 222) is output to fiber 230. In accordance with some embodiments, nonlinear light converter 220 is used to convert a narrowband light pulse to a supercontinuum light pulse that is used for remote sense operations. As an example, if nonlinear light converter 220 corresponds to nonlinear light converter 108A of sensor zone 106A, then the sensor set 110A may perform sense operations using a supercontinuum light pulse output from the nonlinear light converter 220. For more information regarding supercontinuum generation with tapered fibers, reference may be had to J. Teipel et al., Characteristics of supercontinuum generation in tapered fibers using femtosecond laser pulses, Appl. Phys. B 77 245-251 (2003).

The nonlinear light converter 240 of FIG. 2C corresponds to a frequency multiplier converter or frequency divider converter that operates as a spectrum shifting light source. In FIG. 2C, narrowband light 243 traveling through fiber 242 reaches the frequency converter 244. The frequency converter 244 includes a nonlinear material that generates higher or lower frequency light in response to receiving the narrowband light 243. For example, the frequency converter 244 may include a frequency doubler material such as lithium niobate, lithium tantalate, potassium titanyl phosphate, or lithium tribolate. In alternative embodiments, the frequency converter 244 may include a frequency tripler material such as potassium dihydrogen phosphate. In accordance with some embodiments, nonlinear light converter 240 is used to convert a narrowband light pulse to a spectrum-shifted light pulse that is used for remote sense operations. As an example, if nonlinear light converter 240 corresponds to nonlinear light converter 108A of sensor zone 106A, then the sensor set 110A may perform sense operations using a spectrum-shifted light pulse output from the nonlinear light converter 240.

Figure 3:
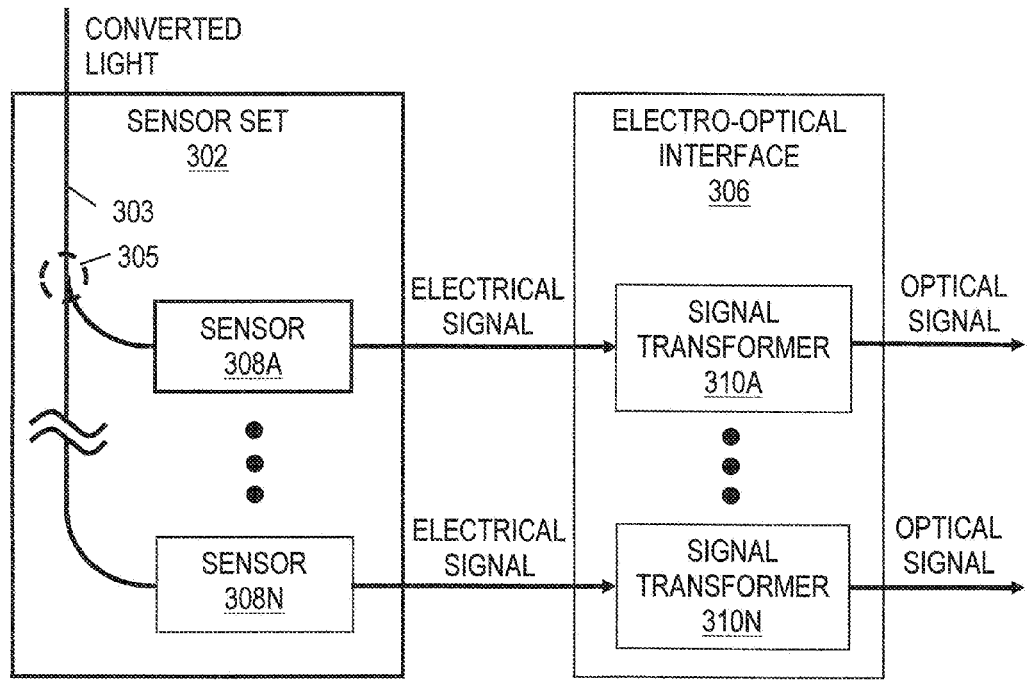
FIG. 3 is a block diagram of an illustrative sensor set and electro-optical interface.

FIG. 3 shows a block diagram of an illustrative sensor set 302 and electro-optical interface 306. The sensor set 302 may correspond to any of the sensor sets 110A-110N in FIG. 1. In sensor set 302, a plurality of sensors 308A-308N are arranged along optical branches that split off from a fiber 303 conveying converted light from a nonlinear light converter (e.g., one of the converters 200, 220, or 240). Optical splitters 305 may be employed, for example, to direct light to different optical branches. Each of the sensors 308A-308N is able to perform sense operations using spectrum-shifted light pulses and to generate corresponding output voltages. The output voltage may correspond to particular chemicals, wavelengths, pressures, strains, or other physical parameters. As an example, the sensors 308A-308N may correspond to fluid analysis sensors that employ ICEs. ICEs can be constructed, for example, with a series of layers having thicknesses and reflectivities designed to interfere constructively or destructively at desired wavelengths. ICE provides an encoded pattern specifically for the purpose of interacting with light from a sample and providing a weighting factor for each wavelength of light for a particular chemical analyte or property within the sample. The modified light is directed to an optical transducer, which converts the light to a voltage signal proportional to the amount of analyte present in the sample. An example ICE fluid analysis sensor is illustrated later in FIG. 4.

The electrical signals output from the sensors 308A-308N are transformed to optical signals by the electro-optical interface 306. As shown, the electro-optical interface 306 includes signal transformer 310A-310N, where signal transformer 310A is associated with sensor 308A, signal transformer 310B is associated with sensor 308B, and so on. Example signal transformers are described in FIGS. 5A-5L.

FIG. 4 shows an illustrative fluid analysis sensor 400. In fluid analysis sensor 400, various optical path components are shown including an ICE 402, a sample interface 414, a bandpass filter 406, an input-side lens 408, output-side lenses 410A and 410B, and detectors 412A and 412B. More specifically, ICE 402 is positioned between a light source 416 and detectors 412A and 412B. Additional or fewer detectors may be used. In some embodiments, detectors 412A and 412B correspond to thermoelectric detectors or themopiles, pyroelectric detectors, or bolometers. As shown, a fluid sample 404 is positioned between the light source 416 and ICE 402. The position of the fluid sample 404 may be set using fluid sample interface 414, which holds the fluid sample in its place. Meanwhile, the input-side lens 408 and the output-side lenses 410A and 410B are configured to focus the direction of light. Further, a bandpass filter (BPF) 406 may be employed on an input-side of ICE 402 to filter certain wavelengths of light. Although FIG. 4 illustrates a suitable arrangement for the optical path components of fluid analysis system 400, it should be understood that other optical path component arrangements are possible. Further, additional optical path components such as lenses and/or reflectors may be employed. Further, in some embodiments, the input-side lens 408 and/or the output-side lenses 410A and 410B are omitted.

The fluid analysis sensor 400 is able to detect certain characteristics of the fluid sample 404 and to correlate these characteristics with particular elements and their concentrations. The principles of operation of fluid analysis system 400 are described, in part, in Myrick, Soyemi, Schiza, Parr, Haibach, Greer, Li and Priore, "Application of multivariate optical computing to simple near-infrared point measurements," Proceedings of SPIE vol. 4574 (2002).

In operation, light from light source 416 passes through lens 408. The light source 416 may be a fiber associated with one of the nonlinear light converters 108A-108N (see FIG. 1) and the lens 408 may be a collimating lens. Light coming out of lens 408 has a specific wavelength component distribution, represented by a spectrum. Bandpass filter 406 transmits light from a pre-selected portion of the wavelength component distribution. Light from bandpass filter 406 passes through sample 404, and then enters ICE 402. According to some embodiments, sample 404 may include a liquid having a plurality of chemical components dissolved in a solvent. For example, sample 404 may be a mixture of hydrocarbons including oil and natural gas dissolved in water. Sample 404 may also include particulates forming a colloidal suspension including fragments of solid materials of different sizes.

Sample 404 will generally interact with light that has passed bandpass filter 406 by absorbing different wavelength components to a varying degree and letting other wavelength components pass through. Thus, light output from sample 404 has a spectrum $S(\lambda)$ containing information specific to the chemical components in sample 404. Spectrum $S(\lambda)$ may be represented as a row vector having multiple numeric entries, $S_i$. Each numeric entry $S_i$ is proportional to the spectral intensity of light at a specific wavelength $\lambda$. Thus, entries $S_i$ are all greater than or equal to zero (0). Furthermore, the detailed profile of spectrum $S(\lambda)$ may provide information regarding the concentration of each chemical component within the plurality of chemicals in sample 440. Light from sample 404 is partially transmitted by ICE 402 to produce light measured by detector 412A after being focused by lens 410A. Another portion of light is partially reflected from ICE 402 and is measured by detector 412B after being focused by lens 410B. In some embodiments, ICE 402 is an interference filter with certain spectral characteristic that can be expressed as row vector $L(\lambda)$. Vector $L(\lambda)$ is an array of numeric entries, $L_i$, such that the spectra of transmitted light and reflected light is:

$$S_{LT}(\lambda) = S(\lambda) \cdot (\tfrac{1}{2} + L(\lambda)), \tag{1.1}$$

$$S_{LR}(\lambda) = S(\lambda) \cdot (\tfrac{1}{2} - L(\lambda)), \tag{1.2}$$

Note that the entries $L_i$ in vector $L(\lambda)$ may be less than zero, zero, or greater than zero. Thus, while $S(\lambda)$, $S_{LT}(\lambda)$, and $S_{LR}(\lambda)$ are spectral intensities, $L(\lambda)$ is a spectral characteristic of ICE 402. From Eqs. (1.1) and (1.2) it follows that:

$$S_{LT}(\lambda) - S_{LR}(\lambda) = 2 \cdot S(\lambda) \cdot L(\pi), \tag{2}$$

Vector $L(\lambda)$ corresponds be a regression vector obtained from the solution to a linear multivariate problem targeting a specific component having concentration $\kappa$ in sample 404. In such case, it follows that:

$$\kappa = \beta \cdot \sum_{\lambda} (S_{LT}(\lambda) - S_{LR}(\lambda)) + \gamma, \tag{3}$$

where $\beta$ is a proportionality constant and $\gamma$ is a calibration offset. The values of $\beta$ and $\gamma$ depend on design parameters of fluid analysis sensor 400 and not on sample 404. Thus, parameters $\beta$ and $\gamma$ may be measured independently of the field application of fluid analysis sensor 400. In at least some embodiments, ICE 402 is designed specifically to provide $L(\lambda)$ satisfying Eqs. (2) and (3), above. By measuring the difference spectra between transmitted light and reflected light, the value of the concentration of the selected component in sample 404 may be obtained. Detectors 412A and 412B may be single area photo-detectors that provide an integrated value of the spectral intensity. That is, if the signal from detectors 412A and 412B is $d_1$ and $d_2$ respectively, Eq. (3) may be readjusted for a new calibration factor $\beta'$ as:

$$\kappa = \beta \cdot (d_1 - d_2) + \gamma, \tag{4}$$

In some embodiments, fluid analysis sensors such as sensor 400 may perform partial spectrum measurements that are combined to obtain the desired measurement. In such case, multiple ICEs may be used to test for a plurality of components in sample 404 that may be of interest. Regardless of the number of ICEs in sensor 400, each ICE may be an interference filter having a series of parallel layers 1 through K, each having a pre-selected index of refraction and a thickness. The number K may be any integer greater than zero.

The ICE description provided above is applicable to a particular ICE configuration. Other ICE configurations may additionally or alternatively be used in the remote sensing system 100. For example, other ICE configurations suitable for use with the remote sensing system 100 are described in U.S. Ser. Nos. 13/456,350, 13/456,379, 13/456,405, and 13/456,443, each filed Apr. 26, 2012, each entitled "Methods and Devices For Optically Determining a Characteristic of a Substance," and each incorporated herein by reference.

There are a variety of fluid analysis sensor configurations that employ ICEs. The configuration of fluid analysis sensor 400 is a transmission mode configuration to measure characteristics of transparent materials. Another fluid analysis sensor may have a reflectance mode configuration to measure characteristics of opaque or semi-transparent materials. Another fluid analysis sensor may have a fluorescence configuration to measure organic organisms. Another fluid analysis sensor may employ a time domain configuration in which a filter wheel with multiple ICE elements turns to obtain measurements from different ICE elements over time. Another fluid analysis sensor employs a parallel processing scheme in which parallel ICEs in a light path are employed to obtain simultaneous measurements.

Figure 5A:
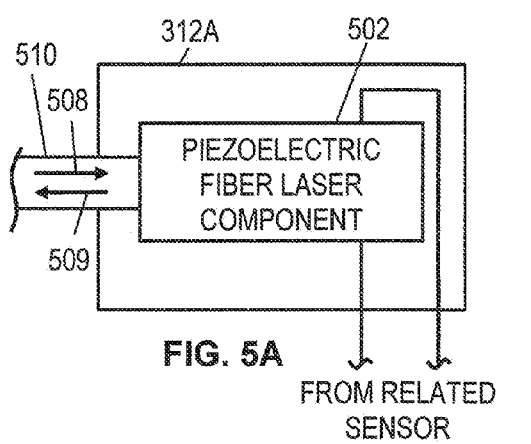
FIGS. 5A-5N show illustrative signal transformers.

Various signal transformers 312A-312N are illustrated in FIGS. 5A-5N. Some of the signal transformers 312A-312N reflect or shift single frequency light while others generate broadband light. For signal transformers that laser light, pump light from a local light source or a remote light source is employed. The signal transformers 312A-312N may correspond to any of the signal transformers 310A-310N described in FIG. 3.

In FIG. 5A, signal transformation involves inverse piezoelectric effect to induce strain in a fiber laser. In the embodiment of FIG. 5A, the signal transformer 312A includes a piezoelectric element 502. In some embodiments, the piezoelectric element 502 corresponds to a PZT (lead zirconate titanate) cylinder or tube bonded to a fiber laser sensor. The fiber laser sensor includes a length of single mode, photosensitive erbium-doped fiber (EDF) within which a Bragg grating is formed. Each end of the doped fiber is spliced to a passive fiber and the erbium is pumped with a semiconductor laser preferably around 1480 nm. The emission wavelength is determined primarily by the pitch of the grating and can be set within the erbium window (1525-1560 nm). The laser structure supports a single fundamental mode, and thus emits a fundamental frequency. The piezoelectric element is electrically connected across the detector 142 associated with the sensor 308, and the fiber laser is spliced to the optical fiber 510

In operation, the piezoelectric fiber laser component 502 is configured to laser at an emission wavelength determined by the pitch of the grating, through the pump light 508 received via optical fiber 510. The pitch of the grating changes according to the amount of strain induced by the related sensor 308. The amount of strain corresponds to the voltage signal generated by related sensor 308. The fiber laser of piezoelectric fiber laser component 502 undergoes shift in the lasing frequency, where a shift in the lasing frequency of the fundamental mode is determined by the strain induced. In other words, the frequency shift is converted into an interferometric phase shift corresponding to the voltage signal.

In some embodiments, the strain induced on the fiber laser of piezoelectric fiber laser component 502 may be on the order of nano-strain for a voltage signal of 5 mV from the related sensor 308. (Fiber laser strain sensing is capable of resolving strains as low as pico-strain.) In addition, fiber lasers are multiplexable. For example, approximately forty fiber laser can be multiplexed per optical fiber.

In FIGS. 5B, 5D, 5E, 5F, 5H, and 5I, signal transformation involves using a light-emitting diode (LED) to emit light in response to a voltage signal. Where an LED is employed, it may be operated in the very low-power regime (20-100 microamps) to keep the diode near ambient temperature. Due to quantum effects, the LED will generally still radiate sufficient photons for reliable communication with the surface electronics.

Figure 5B:
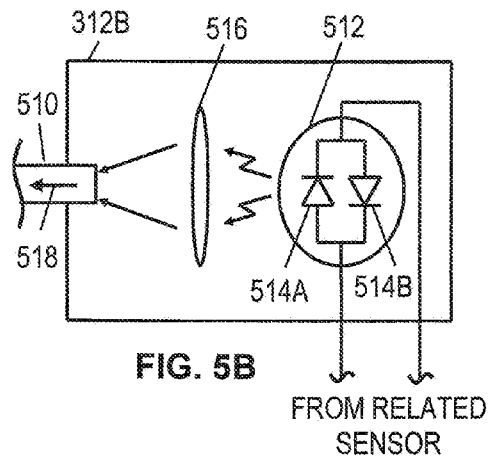

In the embodiment of FIG. 5B, the signal transformer 312B includes a light source 512 coupled to the ends of the related sensor 308 and generating light in relation to the amount of voltage output by the related sensor 308. The light source 512 includes a pair of light emitting diodes (LEDs) 514A and 514B in an antiparallel arrangement. Other suitable light sources include semiconductor diode lasers, superluminescent diodes, and incandescent lamps. The signal transformer 312B also includes a lens 516 that directs at least some of the generated light 518 produced by the light source 512 into the optical fiber 510 associated with the signal transformer 312B. One of the LEDs (e.g., 514A) is energized by a positive voltage peak, whereas the other is energized by a negative voltage peak. The signal transformer 312B may be advantageous in that it does not require sense signal collection interface 114 to provide a light source for sense signal collection operations.

Figure 5D:
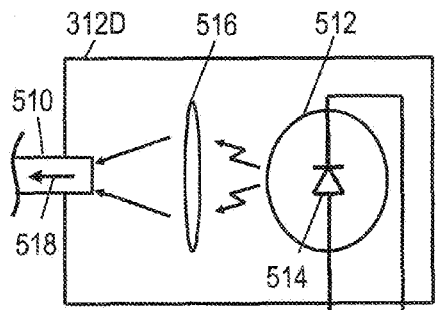

In the embodiment of FIG. 5D, the signal transformer 312D includes light source 512 coupled to the related sensor 308 and producing light when a voltage exists between ends of the related sensor 308. The illustrated light source 512 includes LED 514. Other suitable light sources include semiconductor diode lasers, and superluminescent diodes. The signal transformer 312D also includes lens 516 that directs at least some of the light produced by the light source 512 into the optical fiber 510 associated with the signal transformer 312D. The LED 514 is energized by a voltage peak (e.g., a positive voltage peak). During a sense operation of the related sensor 308, the LED 514 sends generated pulse 518 along optical fiber 510 to the sense signal collection interface 114. The signal transformer 312D may be advantageous in that it does not require sense signal collection interface 114 to provide a light source for sense signal collection operations.

Figure 5E:
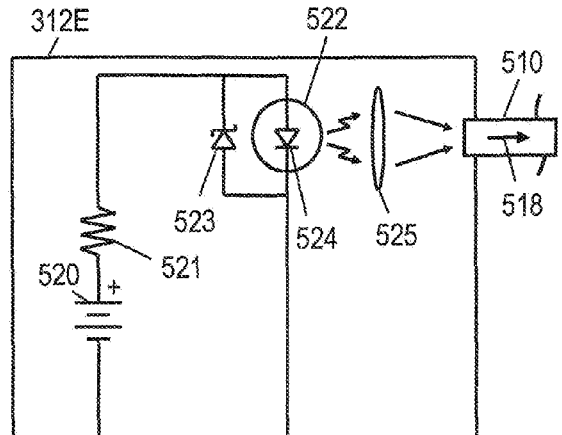

In FIG. 5E, the signal transformer 312E includes a voltage source 520, a resistor 521, a light source 522, and a Zener diode 523. The light source 522 includes an LED 524. The voltage source 520, the resistor 521, the LED 524, and the related sensor 308 are connected in series, forming a series circuit. Those of ordinary skill in the art will recognize that the arrangement of electrical elements in a series circuit can generally be varied without affecting operability. The illustrated voltage source 520 is a direct current (DC) voltage source having two terminals, and one of the two terminals of the voltage source 520 is connected to one end of the related sensor 308. As shown, the LED 524 has two terminals, one of which is connected to the other of the two ends of the related sensor 308. The resistor 521 is connected between the voltage source 520 and the LED 524. The resistor 521 limits a flow of electrical current through the LED 524.

The voltage source 520 produces a DC bias voltage that improves the responsiveness of the light source 522. The voltage source 520 may be or include, for example, a chemical battery, a fuel cell, a nuclear battery, an ultra-capacitor, or a photovoltaic cell (driven by light received from the surface via an optical fiber). In some embodiments, the voltage source 520 produces a DC bias voltage that causes an electrical current to flow through the series circuit including the voltage source 520, the resistor 521, the LED 524, and the related sensor 308, and the current flow through the LED 524 causes the LED 524 to produce light. An optional lens 525 directs some of the light produced by the LED 524 into optical fiber 510 as light 518. The generated light 518 propagates along the optical fiber 510 to the sense signal collection interface 114. The sense signal collection interface 114 detects attributes of the generated light 518 received via the optical fiber 510 to determine physical parameters detected by a related sensor 308. In some embodiments, the generated light 518 produced by the signal transformer 312D has an intensity that varies linearly about the bias point in proportion to an electrical signal produced between the ends of the related sensor 308.

During a sense operation, the related sensor 308 generates positive or negative voltage pulses between the ends of the related sensor 308. Within the series circuit including the voltage source 520, the resistor 521, the LED 524, and the related sensor 308, the voltage pulses produced between the ends of the related sensor 308 are summed with the DC bias voltage produced by the voltage source 520. In some embodiments, a positive voltage pulse produced between the related sensor 308 causes a voltage across the LED 524 to increase, and the resultant increase in current flow through the LED 524 causes the LED 524 to produce more light (i.e., light with a greater intensity). The DC bias voltage produced by the voltage source 520 causes the generated light 518 produced by the signal transformer 312E to have an intensity that is proportional to the voltage signal produced between the ends of the related sensor 308.

The Zener diode 523 is connected between the two terminals of the LED 524 to protect the LED 524 from excessive forward voltages. Other circuit elements for protecting the light source against large voltage excursions are known and may also be suitable. In some embodiments, the light source 522 may be or include, for example, an incandescent lamp, an arc lamp, a semiconductor laser, or a superluminescent diode. The DC bias voltage produced by the voltage source 520 may match a forward voltage threshold of one or more diodes in series with the light source 522.

Figure 5F:
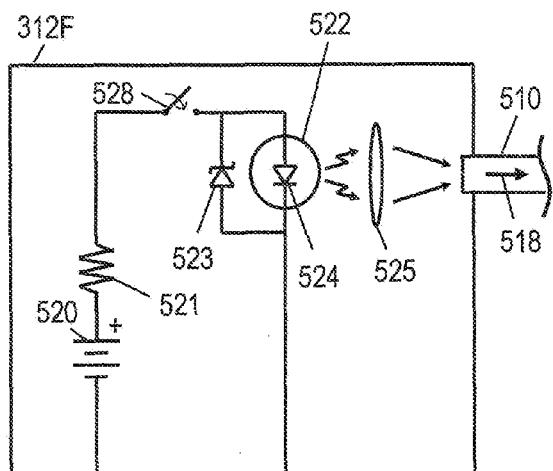

In FIG. 5F, the signal transformer 312F includes some elements shown and described in previous figures, and similarly labeled. As shown, the signal transformer 312F includes a switch 528 in the series circuit including the voltage source 520, the resistor 521, the LED 524, and the related sensor 308. When the switch 528 is closed, current may flow through the series circuit. When the switch 528 is open, current cannot flow through the series circuit, and the LED 524 does not produce light. The switch 528 may be operated to conserve electrical energy stored in the voltage source 520. For example, the switch 528 may be opened when the remote sense architecture 104 or a particular sensor zone is not in use.

In some embodiments, the switch 528 may be opened and closed at a relatively high rate, for example between 50 and 5,000 times (cycles) per second. The ratio of the amount of time that the switch 528 is closed during each cycle to the total cycle time (i.e., the duty cycle) of the switch 528 may also be selected to conserve electrical energy stored in the voltage source 520.

Figure 5G:
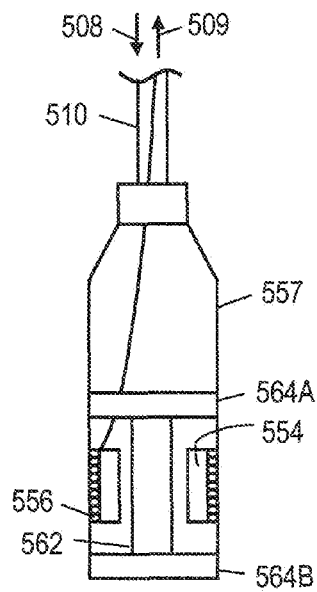
Figure 5H:
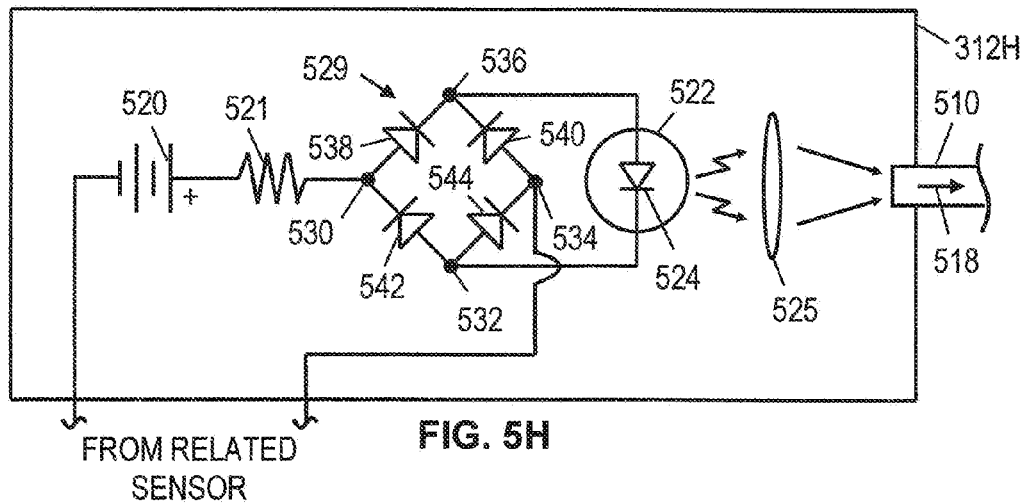

In FIG. 5H, the signal transformer 312H includes some elements shown and described in previous figures, and similarly labeled. As shown, the signal transformer 312H includes the voltage source 520, the resistor 521, a diode bridge 529, and the light source 522 including the LED 524. The diode bridge 529 includes a pair of input nodes 530 and 534, a pair of output nodes 536 and 532, and four diodes 538, 540, 542, and 544. The diode 538 is connected between the input node 530 and the output node 536. The diode 540 is connected between the input node 534 and the output node 536. The diode 542 is connected between the output node 532 and the input node 530. The diode 544 is connected between the output node 532 and the input node 534.

In the embodiment of FIG. 5H, one end of the related sensor 308 is connected to one terminal of the voltage source 520, and the other end of the related sensor 308 is connected to the input node 534 of the diode bridge 529. The resistor 521 is connected between the other terminal of the voltage source 520 and the input node 530 of the diode bridge 529. The two terminals of the LED 524 are connected to the output nodes 536 and 532 of the diode bridge 529. The diode bridge 529 provides a rectified version of electrical signals from the related sensor 308 to the LED 524.

In the embodiment of FIG. 5H, positive and negative voltage pulses induced between the ends of the related sensor 308 are applied to the input nodes 530 and 534 of the diode bridge 529 via the voltage source 520 and the resistor 521. The voltage source 520 overcomes at least a portion of the voltage drop of the diodes 538 and 544 of the diode bridge 529, favoring voltage pulses induced between the ends of the related sensor 308 that cause current to flow through the diodes 538 and 544. As a result, the LED 524 produces more light for voltage pulses between the ends of the related sensor 308 that cause current to flow through the diodes 538 and 544 than for voltage pulses between the ends of the related sensor 308 that cause current to flow through the diodes 540 and 542.

In some embodiments, the voltage source 520 produces a DC bias voltage that causes a current to flow through the resistor 521, the diode 538 of the diode bridge 529, the LED 524, the diode 544 of the diode bridge 529, and the related sensor 308. The resultant current flow through the LED 524 causes the LED 524 to produce light 518.

In other embodiments, the ends of the related sensor 308 are connected to the input nodes 530 and 534 of the diode bridge 529, and the voltage source 520 and the resistor 521 are connected in series with the LED 524 between the output nodes 536 and 532 of the diode bridge 529. The diode bridge 529 may be considered to perform an operation on the voltage pulses similar to an absolute value function. When a positive voltage pulse is produced between the ends of the related sensor 308 and applied to the input nodes 530 and 534 of the diode bridge 529, the positive pulse is reproduced between the output nodes 536 and 532 (minus diode losses). When a negative voltage pulse is produced between the ends of the related sensor 308 and applied between the input nodes 530 and 534, the negative voltage pulse is inverted and reproduced as a positive voltage pulse between the output nodes 536 and 532 (minus diode losses). The (always positive) voltage pulses produced between the output nodes 536 and 532 of the diode bridge 529 are summed with the DC bias voltage produced by the voltage source 520. Accordingly, both positive and negative voltage pulses produced between the ends of the related sensor 308 cause a voltage across the LED 524 to increase, and the resultant increase in current flow through the LED 524 causes the LED 524 to produce more light (i.e., light with a greater intensity). The generated light 518 produced by the signal transformer 312H has an intensity that is proportional to an absolute value of a magnitude of an electrical signal produced between the ends of the related sensor 308.

Figure 5I:
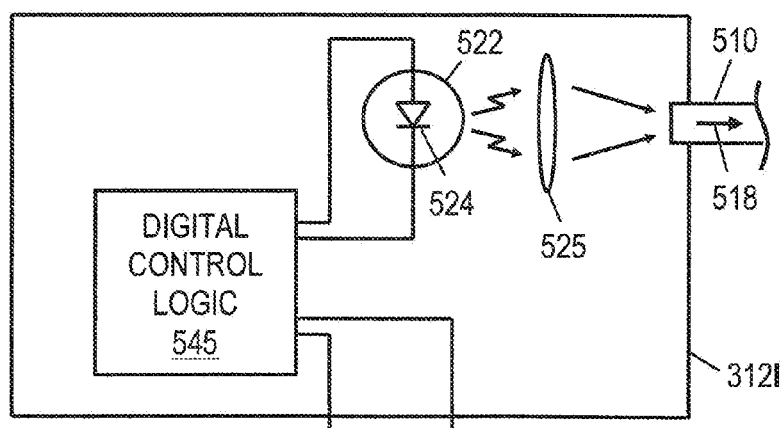

In FIG. 5I, the signal transformer 312I includes some elements shown and described in previous figures, and similarly labeled. As shown, the signal transformer 312 I includes digital control logic 545 coupled to the related sensor 308 and to the light source 522 including the LED 524. The digital control logic 545 receives an electrical signal produced between the ends of the related sensor 308, and controls the LED 524 dependent upon the electrical signal.

In some embodiments, the generated light 518 produced by the signal transformer 312 I has an intensity that is (approximately) proportional to a magnitude of an electrical signal produced between the ends of the related sensor 308. For example, the digital control logic 545 may control the LED 524 such that the LED 524 produces a first amount of light (i.e., light with a first intensity) when the voltage between the ends of the related sensor 308 is substantially zero, a second amount of light (i.e., light with a second intensity) that is greater than the first amount/intensity when a positive voltage pulse is produced between the ends of the related sensor 308, and a third amount of light (i.e., light with a third intensity) that is less than the first amount/ intensity when a negative voltage pulse is produced between the ends of the related sensor 308.

In some embodiments, the digital control logic 545 may control the LED 524 dependent upon one or more stored threshold voltage values. For example, a first threshold voltage value may be a positive voltage value that is less than an expected positive peak value, and a second threshold value may be a negative voltage value that is less than an expected negative peak value. The digital control logic 545 may control the LED 524 such that the LED 524 produces the first amount of light (i.e., the first light intensity) when the voltage between the ends of the related sensor 308 is between the first threshold voltage value and the second threshold voltage value, the second amount of light (i.e., the second light intensity) when the voltage between the ends of the related sensor 308 is greater than the first threshold voltage value, and the third amount of light (i.e., the third light intensity) when the voltage between the ends of the related sensor 308 is greater than (more negative than) the second threshold voltage.

In other embodiments, the digital control logic 545 may control the LED 524 such that a pulse rate of light produced by the LED 524 is dependent the electrical signal from the related sensor 308. For example, the digital control logic 545 may control the LED 524 such that the LED 524 produces light: (i) at a first pulse rate when the voltage between the ends of the related sensor 308 is between the first threshold voltage value and the second threshold voltage value, (ii) at a second pulse rate when the voltage between the ends of the related sensor 308 is greater than the first threshold voltage value, and (iii) at a third pulse rate when the voltage between the ends of the related sensor 308 is greater than (more negative than) the second threshold voltage.

In other embodiments, the digital control logic 545 may control the LED 524 such that durations of light pulses produced by the LED 524 are dependent on the electrical signal from the related sensor 308. For example, the digital control logic 545 may control the LED 524 such that the LED 524 produces light pulses having: (i) a first duration when the voltage between the ends of the related sensor 308 is between the first threshold voltage value and the second threshold voltage value, (ii) a second duration when the voltage between the ends of the related sensor 308 is greater than the first threshold voltage value, and (iii) a third duration when the voltage between the ends of the related sensor 308 is greater than (more negative than) the second threshold voltage.

In FIG. 5K, signal transformation involves using a piezoelectric component that lengthens an optical fiber in response to a voltage signal. As shown, signal transformer 312K includes an (optional) impedance matching transformer 546 coupled between the related sensor 308 and the drive electrodes of a cylinder 548 of piezoelectric material. The impedance matching transformer 546 provides an efficient way to scale the output voltage from the related sensor 308 to match the drive requirements for the piezoelectric cylinder, and may further scale the equivalent impedance of the piezoelectric cylinder to match that of the related sensor 308 facilitate an efficient energy transfer.

The piezoelectric cylinder 548 is a hollow cylinder with an inner surface electrode and an outer surface electrode. The piezoelectric material is a substance that exhibits the reverse piezoelectric effect: the internal generation of a mechanical force resulting from an applied electrical field. Suitable piezoelectric materials include lead zirconate titanate (PZT), lead titanate, and lead metaniobate. For example, lead zirconate titanate crystals will change by about 0.1% of their static dimension when an electric field is applied to the material. The piezoelectric cylinder 548 is configured such that a diameter of the outer surface of the piezoelectric cylinder 548 changes when an electrical voltage is applied between the inner and outer surfaces. As a result, the diameter of the outer surface of the piezoelectric cylinder 548 is dependent on the electrical voltage output from the related sensor 308.

In the embodiment of FIG. 5K, a terminal portion of the optical fiber 510, including an end or terminus 550 of the optical fiber 510, is wound around the outer surface of the piezoelectric cylinder 548. The terminal portion of the optical fiber 510 is tightly wound around the outer surface of the piezoelectric cylinder 548 such that the terminal portion of the optical fiber 510 is under some initial mechanical stress. The terminus 550 is preferably attached to the outer surface of the piezoelectric cylinder 548, and may or may not have a mirrored coating or layer to reflect light (i.e., a mirrored terminus). Even in the absence of a mirrored coating, the terminus 550 may be expected to reflect a significant fraction of the incident light due to an index of refraction mismatch with the air. As the cylinder's diameter expands or contracts, so too does the cylinder's circumference, thereby stretching the length of the terminal portion of the optical fiber 510 accordingly. Any stretching of the optical fiber 510 also increases the mechanical stress being imposed on the fiber 510. These two effects combine to increase the optical path length for source light 508 traveling to the terminus 550 and for reflected light 509 traveling from the terminus 550.

The illustrated signal transformer 512 K may be used when the sense signal collection interface 114 includes a light source that transmits a continuous or pulsed light signal along the optical fiber 105, and further includes a receiver that measures the phase changes or time delays in the light reflected from the terminus 550. Such measurements represent the optical path length changes that are indicative of sense operations. A similar result can be achieved by forming a cylinder of magnetostrictive material rather than piezoelectric material.

In FIG. 5G, signal transformation involves using a magnetostrictive component that lengthens an optical fiber in response to a magnetic field. As shown, the signal transformer 312G includes a magnetostrictive cylinder 554. The magnetostrictive cylinder 554 is a hollow cylinder positioned about the permanent magnet 562 such that the magnetostrictive cylinder 554 and the permanent magnet 562 are coaxial, and the magnetostrictive cylinder 554 is midway between the pole pieces 564A and 564B. The magnetostrictive cylinder 554 exhibits a change in dimensions when a magnetic field is applied. Suitable magnetostrictive cylinder materials include cobalt, Terfenol-D, and $Fe_{81}Si_{3.5}B_{13.5}C_2$ (trade name METGLAS 2605SC). The magnetostrictive cylinder 554 is configured such that a diameter of the outer surface of the magnetostrictive cylinder 554 changes when an applied magnetic field changes. As a result, the diameter of the outer surface of the magnetostrictive cylinder 554 is dependent on the portion of the magnetic field generated by the permanent magnet 562 and applied to the magnetostrictive cylinder 554.

For the signal transformer 312G, a terminal portion of the optical fiber 510, including an end or terminus 556 of the optical fiber 510, is wound around the outer surface of the magnetostrictive cylinder 554. The terminal portion of the optical fiber 510 is tightly wound around the outer surface of the magnetostrictive cylinder 554 such that the terminal portion of the optical fiber 510 is under some initial mechanical stress. The terminus 556 is preferably attached to the outer surface of the magnetostrictive cylinder 554, and may or may not have a mirrored coating or layer to reflect light (i.e., a mirrored terminus).

The signal transformer 312G may be used in conjunction with a sense signal collection interface 114 that includes a light source to convey light to the coiled terminal portion of optical fiber 510. When the source light 508 traveling in the optical fiber 510 reaches the terminus 556, a portion of the light is reflected at the terminus 556 as reflected light 509. The reflected light 509 is conveyed via optical fiber 510 to the sense signal collection interface 114.

In some embodiments, the sense signal collection interface 114 generates the source light 508 as pulses of light, and measures a time between generation of a pulse of the source light 508 and reception of a corresponding pulse of the reflected light 509. In other embodiments, the sense signal collection interface 114 generates a monochromatic and continuous source light 508, and measures a phase difference between the source light 508 and the reflected light 509.

During sense operations, the magnetostrictive cylinder 554 changes its diameter. As a result, the length of the optical path traveled by the source light 508 and the reflected light 509 in the optical fiber 510 also changes. Consequently, the time between generated pulses of the source light 508 and corresponding received pulses of the reflected light 509 changes, as does the difference in phase between generated monochromatic and continuous source light 508 and received reflected light 509.

In FIG. 5L, signal transformation involves using a magneto-optical element that rotates a plane of polarization in response to a voltage signal. As shown, the signal transformer 312L includes a lens 566, a polarizer 568, a magneto-optical element 569, a coil 570, and a reflective surface 571. For signal transformer 312L, a sense signal collection interface 114 may employ a light source, and optical fiber 510 conveys light generated by the sense signal collection interface 114 to the signal transformer 312L as source light 508. The lens 566 collimates the source light 508 from optical fiber 510 to move substantially parallel to an optical axis. The polarizer 568 is positioned on the optical axis to substantially block all components of the source light 508 except those in a selected plane of polarization (e.g., "horizontally" polarized light). The resulting polarized light 574 exits the polarizer 568 and enters the magneto-optical element 569.

The coil 570 (e.g., insulated wire) is wound around the magneto-optical element 569 and has two ends connected to a related sensor 308. When a voltage is generated by the related sensor 308, electrical current flows through the coil 570, producing a magnetic field in and around the coil 570 that passes through the magneto-optical element 569. This magnetic field is hereafter referred to as the "sensing" field to distinguish it from a static biasing field provided by an arrangement of permanent magnets. The sensing field is a transient response to a sense operation, whereas the biasing field remains static. Both fields are oriented parallel to the optical axis.

The magneto-optical element 569 is formed from magneto-optical material that is substantially transparent to the polarized light 574, with the caveat that it rotates the plane of polarization of the polarized light 574 by an amount proportional to the magnetic field along the optical axis. Note that this rotation is not dependent on the light's direction of travel, meaning that as the reflected light 575 propagates back through the magneto-optical material, the plane of polarization is rotated still further in accordance with the strength of the magnetic field. Suitable magneto-optical materials for accomplishing this effect include yttrium iron garnet (YIG) crystals, terbium gallium garnet (TGG) crystals, or terbium-doped glasses (including borosilicate glass and dense flint glass).

The dimensions of the magneto-optical element and the biasing field strength are chosen so that, in the absence of a sensing field, the light polarization goes through a 45° rotation in one pass through the magneto-optical element, for a total rotation of 90° in a two-way trip. Since the polarizer 568 only passes the selected plane of polarization (e.g., horizontal), it blocks the reflected light 575 in the absence of a sensing field. When the sensing field is not zero (e.g., during a sense operation), the sensing field causes the polarization to rotate by an additional angle of, say, $\alpha$. A two-way traversal of the magneto-optical element in the presence of a sensing field causes the polarization to rotate by $2\alpha+90°$, enabling some light to pass through the polarizer as reflected light 509 for conveyance to the sense signal collection interface 114. The intensity of the reflected light 509 is proportional to $\sin^2 2\alpha$, where $\alpha$ is proportional to the sensing field. It is expected that this configuration may advantageously provide a very high sensitivity together with a high immunity to mechanical shock. Also, polarization maintaining fiber may be employed to preserve the changed polarization.

Figure 5J:
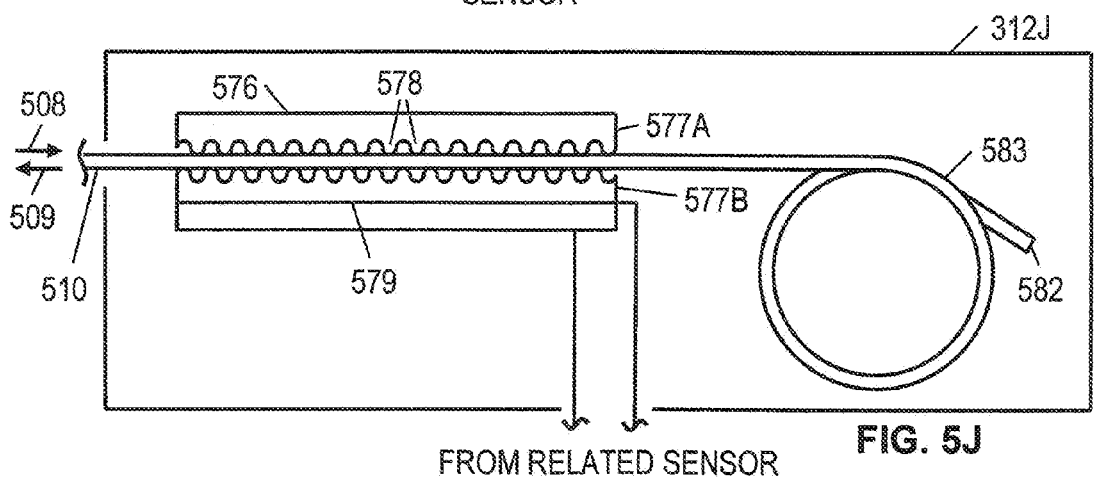

In FIG. 5J, signal transformation involves using a microbend component that strains an optical fiber in response to a voltage signal. More specifically, signal transformer 312J exploits a light-leakage characteristic of optical fibers. Optical fibers typically include a transparent core surrounded by a transparent cladding material having a lower index of refraction, so that light propagating fairly parallel to the fiber's axis is trapped in the core by the phenomenon of total internal reflection. If bent too sharply, however, the angle between the light's propagation path and the cladding interface is no longer sufficient to maintain total internal reflection, enabling some portion of the light to escape from the fiber.

This light leakage characteristic can be exploited with a microbend sensor or microbender 576 such as that shown in FIG. 5J. The microbender 576 includes a pair of opposed ridged elements 577A and 577B, each having a row of ridges 578 in contact with an outer surface of the optical fiber 510. The optical fiber 510 is positioned in a gap between the ridged elements 577A and 577B. The ridges (teeth) 578 of the ridged elements 577A and 577B are aligned so as to intermesh. In other words, ridges on one element align with valleys in the other element and vice versa. A force or pressure that urges the ridged elements 577A and 577B toward one another causes small bends or "microbends" at multiple locations along the optical fiber 510. As a result, light propagating along the optical fiber 510 is attenuated by an amount dependent upon the force or pressure that urges the ridged elements 577A and 577B toward one another.

For the signal transformer 312J, the ridged element 577B is mounted on a piezoelectric substrate 579 that exhibits a change in dimensions when an electric field is applied between its upper and lower surfaces. The leads from a related sensor 308 apply a rectified voltage signal to the upper and lower surfaces of the piezoelectric substrate 579, causing the gap to briefly close in response to the voltage signal from related sensor 308. Alternatively, the substrate 579 may be a magnetostrictive material surrounded by a coil that induces a magnetic field in response to a voltage signal from related sensor 308.

In some embodiments, the sense signal collection interface 114 includes a light source that conveys lights via fiber optic cable 105 and optical fiber 510 to the signal transformer 312J as source light 508. When the source light 508 traveling in the optical fiber 510 reaches an end or terminus 582 of the optical fiber 510, a portion of the light is reflected at the terminus 582 as reflected light 509. The reflected light 509 is conveyed by the optical fiber 510 and fiber optic cable 105 to the sense signal collection interface 114, which may monitor the intensity of the reflected light 509 as a measurement of the related sense operations. The terminus 582 may or may not have a reflective layer or coating (i.e., a mirrored terminus).

In alternative embodiments, the sense signal collection interface 114 may include an optical time domain reflectometer (OTDR) system that generates the source light 508 as pulses of light, and monitors the light scattered back to the surface from imperfections along the length of the fiber. The time required for scattered light to reach the receiver is directly proportional to the position along the fiber where the scattering occurred. Thus the OTDR system sees scattered light from increasingly distant positions as a function of time after the light pulse is transmitted. The increasing distance causes the intensity of the scattered light to show a gentle decrease due to attenuation in the fiber. Though not the subject of the present application, the characteristics of the scattered light can be monitored to provide distributed sensing of temperature and/or pressure along the length of the fiber.

A microbender arrangement an in FIG. 5J, however, will create a sudden change in the scattered light intensity and the scattered light from more distant positions in the fiber will be severely attenuated. The OTDR system can readily measure this attenuation to monitor the voltage signal from the related sensor 308, provided that the optical fiber 510 is provided with a "pigtail" 583 between the microbender 576 and the terminus 582. A length of the pigtail 583 is preferably greater than half a minimum distance resolution of the OTDR system of the sense signal collection interface 114. For example, if a minimum distance resolution of the OTDR system is 3.3 feet (1.0 meter), the length of the pigtail 583 is preferably greater than 1.6 feet (0.5 meter). A selected minimum length of the pigtail 583 may be, for example, 3.3 feet (1.0 meter), but greater lengths are easily employed.

When a pulse of the source light 508 is generated, the scattered light follows a baseline curve as a function of position along the fiber 510, and the intensity of the reflected light 509 is expectedly at a relative maximum value. However, during sense operations by a related sensor 308, the magnetic field passing through the related sensor 308 results in the microbender gap shrinking and causing attenuation of the light passing therein. The scattered light observable by an OTDR system will have a substantial deviation from the baseline curve, and the intensity of reflected light 509 from the fiber terminus 582 will be greatly reduced.

In FIG. 5C, signal transformation involves a hinged reflective surface that reflects an amount of incident light in response to a voltage signal. As shown, signal transformer 312C includes a mirror element 584 adapted to move in response to a voltage signal from its related sensor 308 (e.g., the signal transformer 312C may be associated with any of the sensors 308A-308N) such that an amount of light reflected into optical fiber 510 changes in response to sense operations. The mirror element 584 includes a reflective surface 585 that reflects light. A hinge element 586 attaches the mirror element 584 to a base 587 at one edge of the mirror element 584. A mechanism 588 is coupled between a backside surface 590 of the mirror element 584, opposite the reflective surface 585, and the base 587. The mechanism 588 receives the voltage signal from its related sensor 308, and rotates the mirror element 584 about the hinge element 586 dependent upon the voltage signal from the related sensor 308.

In some embodiments, the source light 508 to the signal transformer 312C is received from the sense signal collection interface 114. As an example, optical fiber 510 may correspond to a fiber of the fiber optic cable 105 or a fiber that branches off from the fiber optic cable 105 to convey light generated by the sense signal collection interface 114 to the signal transformer 312C as source light 508. In alternative embodiments, source light 508 is received from a light source in situ with the signal transformer 312C. In either case, the source light 508 is incident on the reflective surface 585 and the mechanism 588 rotates the mirror element 584 about the hinge element 586 dependent upon the voltage signal from the related sensor 308. Thus, the amount of light reflected from the reflective surface 585 and entering optical fiber 510 as reflected light 509 changes in response to sense operations of the related sensor 308. In some embodiments, the reflected light 509 is conveyed to the sense signal collection interface 114 via fiber optic cable 105 using time division multiplexing (TDM) or wavelength division multiplexing (WDM).

Components of the signal transformer 312C, such as the mirror element 584, the hinge element 586, the mechanism 588, and the base 587, are preferably formed on or from a monolithic substrate such as in a microelectromechanical system (MEMS). Such miniature apparatus are hundreds of times smaller and lighter than typical conventional apparatus. This may be advantageous in that the signal transformer 312C can be made less susceptible to mechanical shocks generated in a downhole environment. For example, a monolithic silicon substrate may form the base 587. The mirror element 584 may be a cantilever structure etched or machined from the silicon substrate, where the hinge element 586 is the remaining silicon that connects the mirror element 584 to the silicon substrate. A reflecting layer may be deposited on an outer surface of the mirror element 584, forming the reflective surface 585.

The mechanism 588 may employ electrical attraction and repulsion to rotate the mirror element 584 about the hinge element 586 dependent upon the voltage signal from the related sensor 308. A first conductive layer may be deposited or otherwise formed on the backside surface 590 of the mirror element 584. A second conductive layer may be deposited or otherwise formed on a surface of the silicon substrate adjacent the first conductive layer. The voltage signal from the related sensor may be applied to the first and second conductive layers such that electrical repulsion between the first and second conductive layers causes the mirror element 584 to rotate about the hinge element 586 in a direction away from the substrate. Conversely, the mirror element 584 can be caused to rotate toward the substrate if the conductive layers are driven at opposite polarities to provide electrical attraction.

In FIG. 5M, signal transformation involves using an optical resonator to shift the wavelength of incident light in response to a voltage signal. In the embodiment of FIG. 5M, the signal transformer 312M includes an optical resonator 592 that adjusts the size of an optical resonance cavity dependent upon the voltage signal from related sensor 308. Thus, source light 508 entering the optical resonator 592 is affected accordingly, and the wavelength of light entering optical fiber 510 as reflected light 509 changes in response to sense operations of the related sensor 308. In some embodiments, light may pass through optical resonator 592 (instead of being reflected) in route to sense signal collection interface 114.

In FIG. 5N, signal transformation involves using a lithium niobate modulator to shift the wavelength of incident light in response to a voltage signal. In the embodiment of FIG. 5N, the signal transformer 312N includes a lithium niobate modulator 594 that adjusts the phase of incident light dependent upon the voltage signal from related sensor 308. Thus, source light 508 incident to the lithium niobate modulator 594 is affected accordingly, and the wavelength of light entering optical fiber 510 as reflected light 509 changes in response to sense operations of the related sensor 308. In some embodiments, light may pass through lithium niobate modulator 594 (instead of being reflected) in route to sense signal collection interface 114.

Figure 6:
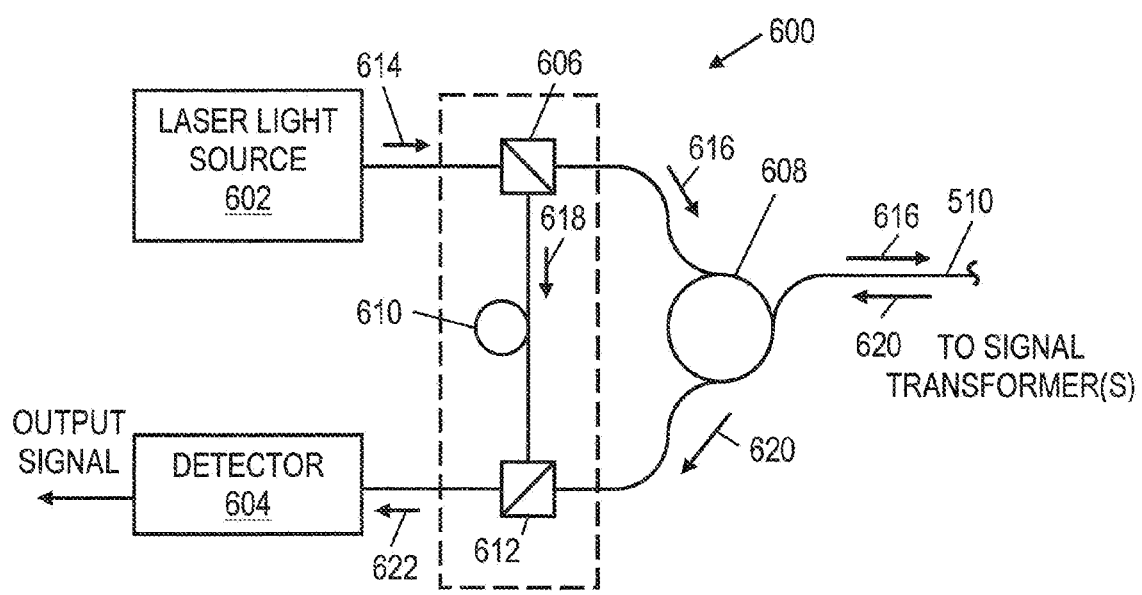
FIG. 6 shows an illustrative source/receiver configuration.

FIG. 6 shows an illustrative source/receiver configuration 600 that may be employed to collect sense signals. The source/receiver configuration 600 may be employed with signal transformers that reflect light such as the signal transformers 312C, 312G, 312J-312N described in FIGS. 5C, 5G, 5J, 5K-5N. Further, the source/receiver configuration 600 may be employed with signal transformers that shift/laser light such as the signal transformer 312A of FIG. 5A. In signal transformer 312A, a fiber laser component of PZT element 502 modulates a frequency of source light depending on the sensor voltage applied to the PZT element 502. The frequency shift is converted into an intensity modulation by an unbalanced Michelson interferometer.

As shown, the source/receiver configuration 600 includes a laser light source 602, a beam splitter 606, an optical circulator 608, a reference path 610, a detector 604, and a beam combiner 612. The laser light source 602 produces a continuous beam of laser light as a source beam 614. The beam splitter 606 splits the source beam 614 into a measurement beam 616 and a reference beam 618 such that the measurement beam 616 and the reference beam 618 each have about half the intensity of the source beam 614. The measurement beam 616 is transmitted along the optical fiber 510 by optical circulator 608, while the reference beam 618 follows the reference path 610 (e.g., a selected length of optical fiber).

In operation, light 614 from laser light source 602 is received by beam splitter, which outputs a reference beam 618 and a source light 616 for one or more signal transformers 312. The source 616 is subjected to a phase change or intensity change in accordance with the output voltage of the related sensor 308, and reflected towards detects 604 as reflected beam 620. The optical circulator 608 directs the reflected beam 620 beam to beam combiner 612. The beam combiner 612 combines the reflected beam 620 with the reference beam 618 to provide a resultant beam 622 to detector 604. As the two components of the resultant beam are coherent, they undergo constructive or destructive interference depending on their difference in phase. As the phase difference changes, the detector 604 observes intensity oscillations between a maximum and minimum value, each complete oscillation corresponding to one "interference fringe". The occurrence of a large number of interference fringes in a short amount of time is indicative of a predetermined voltage output by a related sensor 308. The variety of suitable interferometer configurations includes Michelson, Mach-Zehender, Fabry-Perot, and Sagnac.

Some source/receiver configurations omit the reference arm (beam splitter 606, reference path 610, and beam combiner 612). More specifically, the reference arm may be employed for signal transformers 312G, 312K, and 312N (see FIGS. 5G, 5K, and 5N), where the phase of reflected light 620 is affected by the output voltage of a sensor and can be used to determine sense operation information. Meanwhile, the reference arm may be omitted for signal transformers 312A, 312J, 312L, and 312C (see FIGS. 5A, 5J, 5L, and 5C), where the intensity (as opposed to phase) of reflected light 620 is affected by the output voltage of a sensor and can be used to determine sense operation information. In such case, the detector 604 directly monitors the reflected signal intensity rather than employing an interferometer configuration. Further, in some remote sense systems (e.g., in those employing signal transformers 312B, 312D, 312E, 312F, 312H, and 312I of FIGS. 5B, 5D, 5E, 5F, 5H, and 5I), the sense signal collection interface 114 does not require a light source at all, as the light is generated downhole.

Figure 9:
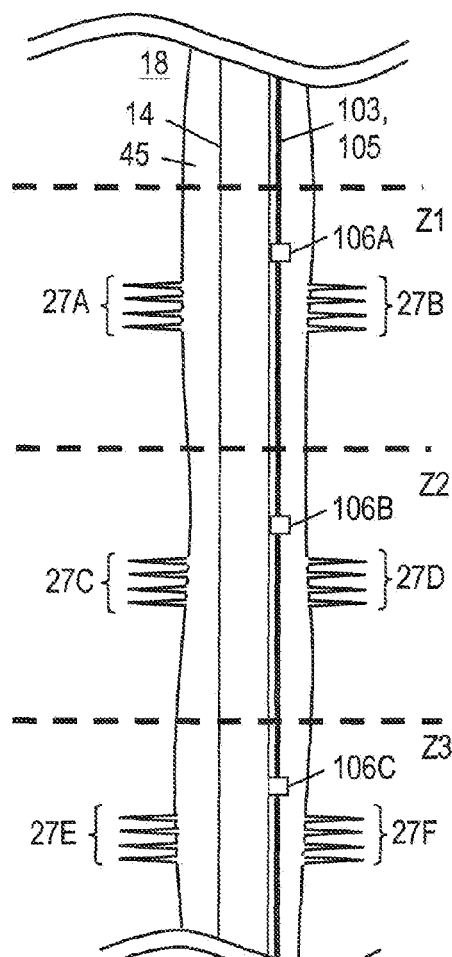

FIGS. 7-9 show illustrative well environments in which the remote sensing system 100 of FIG. 1 may be employed. FIG. 7 shows a production well 10 equipped with an illustrative downhole monitoring system 12 that includes remote sensing system 100. The well 10 shown in FIG. 7 has been constructed and completed in a typical manner, and it includes a casing string 14 positioned in a borehole 16 that has been formed in the earth 18 by a drill bit. The casing string 14 includes multiple tubular casing sections (usually about 30 foot long) connected end-to-end by couplings 20. Within the well 10, cement 22 has been injected between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to the surface of the earth 18. Perforations 26 have been formed at a bottom of the borehole 16 to facilitate the flow of a fluid 28 from a surrounding formation (i.e., a "formation fluid") into the borehole and thence to the surface via an opening 30 at the bottom of the production tubing string 24. Though only one perforated zone is shown, many production wells may have multiple such zones, e.g., to produce fluids from different formations.

The downhole monitoring system 12 is adapted to detect physical parameters such as chemicals, wavelengths, pressures, strains, or other physical parameters. The downhole treatment monitoring system 12 may enable monitoring of physical parameters over time or at particular moments in time.

In the embodiment of FIG. 7, the downhole treatment monitoring system 12 includes a sensor zone 106 (e.g., zones 106A-106N) near the fluid 28 at the bottom of the borehole 16. The sensor zone 106 is coupled to an interface 42 via fiber optic cables 103 and 105, or a single cable with multiple fibers. In some embodiments, the interface 42 is located on the surface of the earth 18 near the wellhead, i.e., a "surface interface" and may include light sources 102 and 602.

In the embodiment of FIG. 7, the fiber optic cables 103 and 105 extend along an outer surface of the casing string 14 and are held against the outer surface of the casing string 14 at spaced apart locations by multiple bands 46 that extend around the casing string 14. A protective covering 48 may be installed over fiber optic cables 103 and 105 at each of the couplings of the casing string 14 to prevent the cables from being pinched or sheared by the coupling's contact with the borehole wall. Such protective coverings 48 are held in place by two of the bands 46 installed on either side of coupling 20.

In at least some embodiments, the fiber optic cable 103 terminates at surface interface 42 with an optical port adapted for coupling the fiber optic cable to a light source (e.g., light source 102). The light source of surface interface 42 transmits light along the fiber optic cable 103 to the sensor zone 106, which operates to convert a narrowband light pulse transmitted from the surface interface 42 to a spectrum-shifted light pulse. One or more sensors included with the sensor zone 106 perform sense operations using the spectrum-shifted light pulse and generate corresponding voltage signals. The voltage signals are transformed to optical signals to convey sense operation information back to surface interface 42.

In some embodiments, fiber optic cable 103 includes sufficient fibers to convey sense signals back to the surface interface 42, which may include the sense signal collection interface 112. In alternative embodiments, fiber optic cable 103 conveys light to nonlinear light converters of remote sense architecture 104, while fiber optic cable 105 conveys sense signals to surface interface 42. The surface interface 42 may include optical ports, a detector, and/or other signal collection means such as those described for source/receiver configuration 600 of FIG. 6.

The illustrative downhole treatment monitoring system 12 of FIG. 7 further includes a computer 60 coupled to the surface interface 42 to control monitoring and analysis operations. The illustrated computer 60 includes a chassis 62, an output device 64 (e.g., a monitor as shown in FIG. 7, or a printer), an input device 66 (e.g., a keyboard), and information storage media 68 (e.g., magnetic or optical data storage disks). However, the computer may be implemented in different forms including, e.g., an embedded computer permanently installed as part of the surface interface 42, a portable computer that is plugged into the surface interface 42 as desired to collect data, a remote desktop computer coupled to the surface interface 42 via a wireless link and/or a wired computer network, a mobile phone/PDA, or indeed any electronic device having a programmable processor and an interface for I/O.

The computer 60 receives electrical output signals produced by the surface interface 42 that correspond to sense signals from the sensor zone 106, and determines downhole conditions related to the physical parameters indicated by the sense signals. The computer 60 also may display results for one or more downhole zones. Further, the computer 60 or an operator may update operations for drilling, well completion, formation treatment, or production based on the determined downhole conditions.

In some embodiments, the information storage media 68 stores a software program for execution by computer 60. The instructions of the software program may cause the computer 60 to organize or display information regarding downhole conditions based on the sense signals collected from surface interface 42. Further, the software program may cause the computer 60 to display results including downhole conditions over time for one or more zones. Further, the software program may cause the computer 60 or an operator to update operations for drilling, well completion, formation treatment, or production based on the determined downhole conditions.

FIG. 8 shows an alternative embodiment of a downhole monitoring system 12, where the fiber optic cables 103 and 105 are strapped to the outside of the production tubing 24 rather than the outside of casing 14. Two perforations 26A and 26B have been created in the borehole 16 to facilitate obtaining formation fluids from two different zones. Formation fluid from a first of the two zones enters the production tubing 24 via the perforation 26A, and formation fluid from the other zone enters the production tubing 24 via the perforation 26B. A packer 90 seals an annulus around the production tubing 24 and defines two different zones. A first sensor zone 106A is positioned on one side of the packer 90 adjacent the perforation 26A, and a second sensor zone 106B is positioned on an opposite side of the packer 90 adjacent the perforation 26B. The sensor zones 106A and 106B operate as disclosed herein. Briefly, narrowband light received by the sensor zones 106A and 106B is converted to spectrum-shifted lights pulses, and the spectrum-shifted light pulses are used for sense operations within sensor zones 106A and 106B. The sensors in sensor zones 106 and 106B generate voltage signals in response to sense operations. These voltage signals are transformed to optical signals are described herein for conveyance to the surface interface 42.

In the embodiment of FIG. 8, the fiber optic cables 103 and 105 exit through an appropriate port in a "Christmas tree" 100, i.e., an assembly of valves, spools, and fittings connected to a top of a well to direct and control a flow of fluids to and from the well. The fiber optic cables 103 and 105 extend along the outer surface of the production tubing 24, and are held against the outer surface of the production tubing 24 at spaced apart locations by multiple bands 46 that extend around the production tubing 24. Although both fiber optic cables 103 and 105 are shown to extend between sensor zones 106A and 106B and surface interface 42, some embodiments may employ a different fiber configuration such as a different set of fiber optic cables for each sensor zone, or a fiber optic cable with multiple fibers to convey source light and reflected light as described herein.

FIG. 9 shows a distribution of sensor zones 106A-106C along a section of a well 10. The zones (Z1-Z3) may be created by any known zoning mechanism. In some embodiments, Z1-Z3 are connected along an annular 45 between casing string 14 and formation 18. As shown, fiber optic cables 103 and 105 may extend to the zones to enable sense operations as described herein. Sense operations may monitor downhole conditions near perforations 27A and 27B of Z1, near perforations 27C and 27D of Z2, and/or near perforations 27D and 27E of Z3. More specifically, sensor zone 106A may perform sense operations for Z1, sensor zone 106B may perform sense operations for Z2, and sensor zone 106C may perform sense operations for Z3. As desired, additional sensor zones 106 may be employed in one or more of zones Z1-Z3 to enable higher resolution downhole condition estimates to be made. Further, each sensor zone may employ a variety of sensors. In different embodiments, zones Z1-Z3 may vary with respect to size, the number of perforations, the number of sensor zones 106, and/or the number of sensors in different sensor zones 106.

Figure 10:
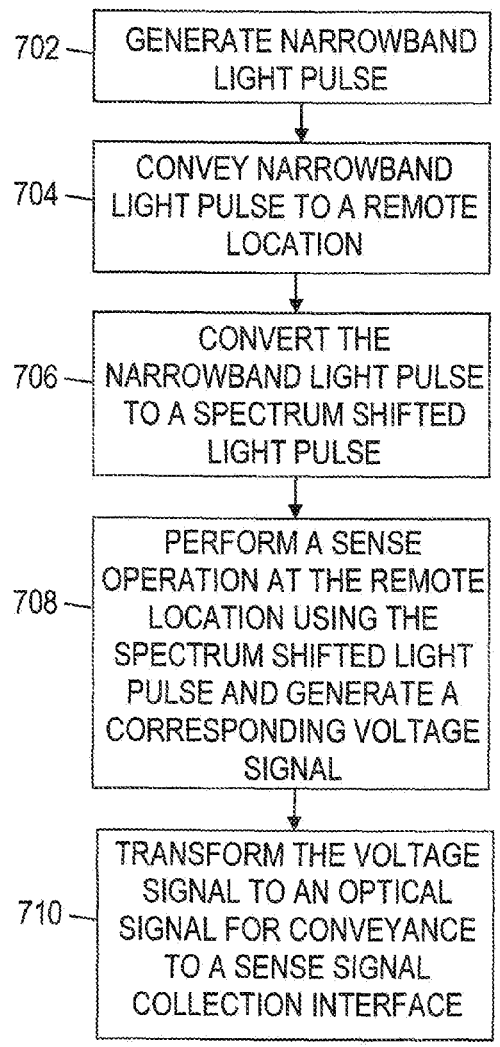
FIG. 10 shows an illustrative remote sensing method.

FIG. 10 shows an illustrative remote sensing method 700. As shown, the method 700 includes generating a narrowband light pulse at block 702. The narrowband light pulse may be generated, for example, by a laser. At block 704, the narrow band light pulse is conveyed to a remote location such as a downhole environment or other extreme environment. At block 706, the narrowband light pulse is converted to a spectrum-shifted light pulse. The conversion may be performed by a nonlinear light converter as described herein. At block 708, a sense operation is performed at the remote location using the spectrum-shifted light pulse. The sense operation may be performed by various sensors as described herein and results in electrical signals that can be correlated with particular chemicals, wavelengths, pressures, strains, or other physical parameters. At block 710, the voltage signal is transformed to an optical signal for conveyance to a sense signal collection interface (e.g., sense signal collection interface 114). Different signal transformers such as signal transformers 312A-312L described herein may be used to transform a voltage signal from a sensor to an optical signal. Further, different source/receiver configurations 600 may be employed in conjunction with the signal transformers as described herein. The source/receiver configurations may vary depending on the transformation technique. As described herein, the phase of reflected light, the intensity of reflected light, or generated light may be used to convey sense operation information.

The disclosed embodiments enable ICE sensors or other sensors to be employed in remote or extreme environments. Rather than use electronics, amplifiers, and physical cables, the disclosed embodiments use optical fibers to provide source light to nonlinear light converters as well as to collect sense signals from signal transformers. The reduction or elimination of electronics to convey the output of remote ICE sensors or other sensors to a data collection interface provides benefits such as: 1) improved accuracy; 2) multiplexability; 3) low loss optical transmission to the surface; 4) permanent deployment; and 5) elimination of downhole electronics that do not perform as well in extreme environments.

Numerous modifications, equivalents, and alternatives will become apparent to those skilled in the art once the above disclosure is fully appreciated. For example, though the methods disclosed herein have been shown and described in a sequential fashion, at least some of the various illustrated operations may occur concurrently or in a different sequence, with possible repetition. It is intended that the following claims be interpreted (where applicable) to embrace all such modifications, equivalents, and alternatives.

What is claimed is:

1. A remote sensing system, comprising:
a light source;
a sensing architecture deployed in a plurality of downhole sensor zones external to a casing, wherein each sensor zone comprises:
   a broadband light source comprising a nonlinear light converter optically coupled to and remote from the light source, wherein the nonlinear light converter converts a narrowband light pulse received from the light source to a broadband light pulse; and
   a sensor that performs a fluid analysis sense operation based on the broadband light pulse passing through or reflecting from a downhole fluid, wherein the sensor comprises an Integrated Computation Element (ICE) and a detector that generates an electrical signal corresponding to the fluid analysis sense operation; and
   an electro-optical interface in situ with the sensor that transforms the electrical signal to an optical signal for conveyance to a signal collection interface.

2. The remote sensing system of claim 1, wherein at least one of the electro-optical interfaces comprises a piezoelectric fiber laser component that reflects light with a shifted fundamental frequency in response to a respective electrical signal.

3. The remote sensing system of claim 1, wherein at least one of the electro-optical interfaces comprises a light-emitting diode (LED) that emits light in response to a respective electrical signal.

4. The remote sensing system of claim 1, wherein at least one of the electro-optical interfaces comprises a hinged reflector that reflects an amount of incident light in response to a respective electrical signal.

5. The remote sensing system of claim 1, wherein at least one of the electro-optical interfaces comprises a piezoelectric or magnetostrictive component that lengthens an optical fiber in response to a respective electrical signal.

6. The remote sensing system of claim 1, wherein at least one of the electro-optical interfaces comprises a magneto-optical element that rotates a plane of polarization in response to a respective electrical signal.

7. The remote sensing system of claim 1, wherein at least one of the electro-optical interfaces comprises a microbend component that strains an optical fiber in response to a respective electrical signal.

8. The remote sensing system of claim 1, wherein at least one of the electro-optical interfaces comprises an optical resonator configured to adjust an optical resonance cavity in response to a respective electrical signal.

9. The remote sensing system of claim 1, wherein at least one of the electro-optical interfaces comprises a lithium niobate modulator configured to adjust a light pulse phase in response to a respective electrical signal.

10. The remote sensing system of claim 1, wherein at least one of the electro-optical interfaces modifies light from a remote light source based on a respective electrical signal.

11. The remote sensing system of claim 1, wherein at least one of the electro-optical interfaces modifies light from a local light source based on a respective electrical signal.

12. A remote sensing method, comprising:
generating a narrowband light pulse;
conveying the narrowband light pulse to a sensing architecture deployed in a plurality of downhole sensor zones external to a casing;
converting, by a non-linear light converter in each sensor zone, the narrowband light pulse to a broadband light pulse;
performing, by a sensor in each sensor zone, a fluid analysis sense operation based on the broadband light pulse passing through or reflecting from a downhole fluid, wherein each sensor comprises an integrated computation element (ICE) and a detector that generates an electrical signal corresponding to the fluid analysis sense operation;
transforming, by an electro-optical interface in each sensor zone, the electrical signal to an optical signal for conveyance to a sense signal collection interface; and
displaying fluid analysis sensing results for each sensing zone based on the conveyed optical signals.

13. The remote sensing method of claim 12, wherein transforming the electrical signal to an optical signal comprises adjusting an intensity of reflected light in response to the electrical signal.

14. The remote sensing method of claim 12, wherein transforming the electrical signal to an optical signal comprises adjusting phase or wavelength characteristics of reflected light in response to the electrical signal.

15. The remote sensing method of claim 12, wherein transforming the electrical signal to an optical signal comprises generating light in response to the electrical signal.

16. The remote sensing method of claim 12, wherein transforming the electrical signal to an optical signal comprises modifying light from a remote light source based on the electrical signal.

17. The remote sensing system of claim 12, wherein transforming the electrical signal to an optical signal comprises modifying light from a local light source based on the electrical signal.

18. The remote sensing method of claim 12, further comprising:
multiplexing optical signals from different sensor zones for conveyance to a surface signal collection interface.

19. A downhole monitoring system, comprising:
a surface light source; and
a plurality of downhole sensor zones along a downhole casing's exterior, each of the downhole sensor zones having a nonlinear light converter optically coupled to the surface light source, a plurality of sensors, and an electro-optical interface for each of the sensors,
wherein each of the nonlinear light converters is configured to convert a narrowband light pulse received from the surface light source to a broadband light pulse,
wherein each of the sensors is configured to perform fluid analysis sense operations based on broadband light passing through or reflecting from a downhole fluid, wherein each sensor comprises an integrated computation element (ICE) and a detector to output a corresponding electrical signal; and
wherein each electro-optical interface is configured to transform electrical signals to optical signals for conveyance to a sense signal collection interface.

* * * * *

UNITED STATES PATENT AND TRADEMARK OFFICE
CERTIFICATE OF CORRECTION

PATENT NO. : 9,575,209 B2
APPLICATION NO. : 13/726041
DATED : February 21, 2017
INVENTOR(S) : Etienne M. Samson et al.

It is certified that error appears in the above-identified patent and that said Letters Patent is hereby corrected as shown below:

In the Specification

Column 5, Equation (2), the right-hand of the equation "$2 \cdot S(\lambda) \cdot L(\pi)$" should read as --$2 \cdot S(\lambda) \cdot L(\lambda)$--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*